(12) United States Patent
Morigami

(10) Patent No.: US 11,924,429 B2
(45) Date of Patent: Mar. 5, 2024

(54) INFORMATION PROCESSING DEVICE AND INFORMATION PROCESSING METHOD FOR DETERMINATION OF OPTIMUM QUANTIZATION COEFFICIENTS

(71) Applicant: SONY GROUP CORPORATION, Tokyo (JP)

(72) Inventor: Yoshitaka Morigami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 254 days.

(21) Appl. No.: 17/434,880

(22) PCT Filed: Dec. 18, 2019

(86) PCT No.: PCT/JP2019/049611
§ 371 (c)(1),
(2) Date: Aug. 30, 2021

(87) PCT Pub. No.: WO2020/183846
PCT Pub. Date: Sep. 17, 2020

(65) Prior Publication Data
US 2022/0166980 A1 May 26, 2022

(30) Foreign Application Priority Data
Mar. 8, 2019 (JP) .................... 2019-043189

(51) Int. Cl.
*H04N 19/124* (2014.01)
*H04N 19/129* (2014.01)
(Continued)

(52) U.S. Cl.
CPC ......... *H04N 19/124* (2014.11); *H04N 19/129* (2014.11); *H04N 19/147* (2014.11);
(Continued)

(58) Field of Classification Search
None
See application file for complete search history.

(56) References Cited

U.S. PATENT DOCUMENTS

2007/0065023 A1* 3/2007 Lee .................. H04N 19/18
375/E7.176
2016/0212427 A1* 7/2016 Yoneoka ............. H04N 19/176

FOREIGN PATENT DOCUMENTS

JP 2000-287208 A2 10/2000
JP 2000287208 A * 10/2000
(Continued)

OTHER PUBLICATIONS

Karczewics, et al., "Rate Distortion Optimized Quantization", ITU-Telecommunication Standardization Sector Study Group 16 Question 6, Video Coding Expert Group (VCEG), 34th Meeting: Antalya Turkey, XP030003559, Jan. 12-13, 2008.
(Continued)

*Primary Examiner* — Stuart D Bennett
(74) *Attorney, Agent, or Firm* — CHIP LAW GROUP

(57) ABSTRACT

A scaling unit (30) (quantization processing unit) quantizes a coding target image divided into blocks. A coefficient determination unit (47) (coefficient change unit) changes a coefficient value in a specific frequency range among quantization coefficients corresponding to respective sub-blocks calculated by the scaling unit (30) by quantization. Thus, the image coding device (10) determines a final position of a coefficient just by counting the number of appearances of non-zero coefficients, and thus corrects the quantization coefficients without correcting coding distortion by iterative operation.

12 Claims, 25 Drawing Sheets

(51) Int. Cl.
H04N 19/147 (2014.01)
H04N 19/176 (2014.01)
H04N 19/18 (2014.01)
H04N 19/154 (2014.01)

(52) U.S. Cl.
CPC .......... *H04N 19/176* (2014.11); *H04N 19/18* (2014.11); *H04N 19/154* (2014.11)

(56) References Cited

FOREIGN PATENT DOCUMENTS

| JP | 2001-128117 A | 5/2001 |
| JP | 2010-087770 A | 4/2010 |
| JP | 2010087770 A * | 4/2010 |

OTHER PUBLICATIONS

Chen, et al., "Argorithm description for Versatile Video Coding and Test Model 3 (VTM 3)", Joint Video Experts Team (JVET) of ITU-T SG 16 WP 3 and ISO/IECJTC 1/SC 29/WG 11, 12th Meeting, Macao, CN, Oct. 3-12, 2018.
International Search Report and Written Opinion of PCT Application No. PCT/JP2019/049611, dated Mar. 10, 2020, 09 pages of ISRWO.

* cited by examiner

FIG. 6

| CODING ORDER OF SUB-BLOCKS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| coded_sub_block_flag | | | | | | | | (1) | 0 | 0 | 1 | 1 | 1 | 1 | 1 | 1 |

Tb1

{ BLANK FIELD: NO INFORMATION TRANSMITTED
1 : THERE IS COEFFICIENT OTHER THAN 0
0 : THERE IS NO COEFFICIENT OTHER THAN 0
(1) : FINAL POSITION OF COEFFICIENT OTHER THAN 0
NO INFORMATION IS TRANSMITTED }

FIG. 7

| CODING ORDER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Sig_Coeff_flag OF SUB-BLOCK #7 | | | | | | | | | (1) | 0 | 1 | 0 | 0 | 0 | 0 | 0 |

| CODING ORDER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Sig_Coeff_flag OF SUB-BLOCK #10 | 0 | 0 | 1 | 0 | 0 | 0 | 0 | 0 | 0 | 0 | 0 | 0 | 0 | 0 | 0 | 1 |

Tb3 points to column 4.

FIG. 9

| CODING ORDER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Sig_Coeff_flag OF SUB-BLOCK #7 | | | | | | | | | (1) | 0 | 1 | 0 | 0 | 0 | 0 | 0 |
| coeff_abs_level_greter1 | | | | | | | | | 0 | | 0 | | | | | |
| coeff_abs_level_greter2 | | | | | | | | | | | | | | | | |
| coeff_abs_level_remain | | | | | | | | | | | | | | | | |
| coeff_sign_flag | | | | | | | | | 0 | | 0 | | | | | |

Tb4 points to column 4.

FIG. 10

| COEFFICIENT VALUE | 6 | 5 | 4 | 3 | 2 | 1 | 0 |
|---|---|---|---|---|---|---|---|
| Sig_Coeff_flag | 1 | 1 | 1 | 1 | 1 | 1 | 0 |
| coeff_abs_greater1 | 1 | 1 | 1 | 1 | 1 | 0 | |
| coeff_abs_greater2 | 1 | 1 | 1 | 1 | 0 | | |
| coeff_abs_remain | 3 | 2 | 1 | 0 | | | |
| coeff_sign_flag | 0 | 0 | 0 | 0 | 0 | 0 | |

SYNTAX IN CASE OF NORMAL SCAN: 0011 (NUMBER OF SYMBOLS IS 4)

| CODING ORDER OF SUB-BLOCKS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| coded_sub_block_flag | | | | | | | | | | | | (1) | 0 | 0 | 1 | 1 |

Tb11

SYNTAX IN CASE OF SCAN TO MAINTAIN RECTANGLE: 011 (NUMBER OF SYMBOLS IS 3)

| CODING ORDER OF SUB-BLOCKS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| coded_sub_block_flag | | | | | | | | | | | | | (1) | 0 | 1 | 1 |

(1) IS NOT TRANSMITTED

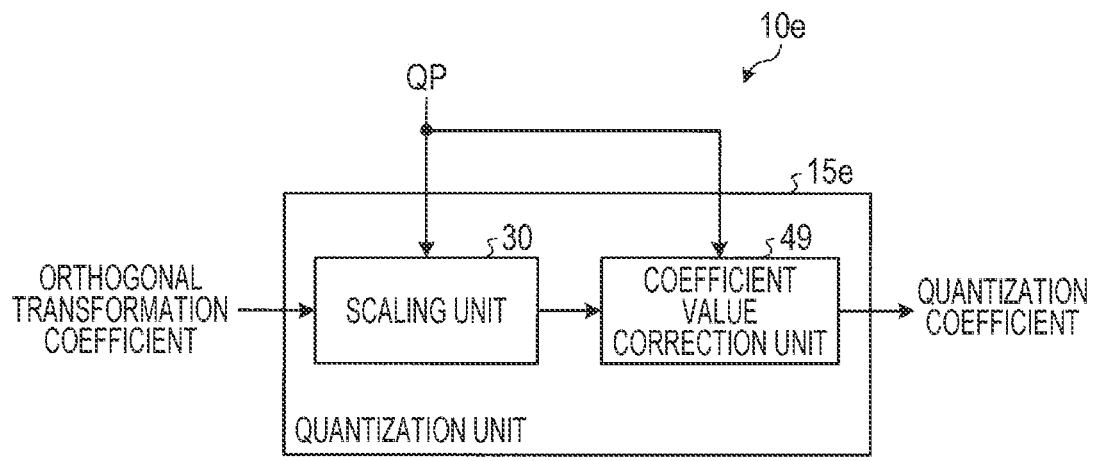

INFORMATION PROCESSING DEVICE AND INFORMATION PROCESSING METHOD FOR DETERMINATION OF OPTIMUM QUANTIZATION COEFFICIENTS

CROSS REFERENCE TO RELATED APPLICATIONS

This application is a U.S. National Phase of International Patent Application No. PCT/JP2019/049611 filed on Dec. 18, 2019, which claims priority benefit of Japanese Patent Application No. JP 2019-043189 filed in the Japan Patent Office on Mar. 8, 2019. Each of the above-referenced applications is hereby incorporated herein by reference in its entirety.

TECHNICAL FIELD

The present disclosure relates to an information processing device, an information processing method, and a program, and relates to an information processing device, an information processing method, and a program capable of executing rate-distortion optimized quantization at a low calculation cost.

BACKGROUND ART

In High Efficiency Video Coding (HEVC), which is a representative image coding method, rate-distortion optimized quantization (RDOQ) is performed in order to correct a balance between image quality and compression efficiency of a moving image obtained by decoding coded moving image data. The RDOQ determines a quantization coefficient so as to minimize a coding cost in consideration of a coding error and a coding amount when an orthogonal transformation coefficient obtained by orthogonally transforming a prediction error signal of each pixel in a block obtained by dividing each image included in the moving image data is quantized. Thus, it is possible to perform coding in which a coding error is as small as possible with a small code amount.

Furthermore, in the Joint Video Experts Team (JVET), discussions on Versatile Video Coding (VVC) have been conducted with an aim to standardize a new video codec exceeding the HEVC. Among them, for example, a technology of what is called zero out has been discussed, in which all coefficients in a sub-block on the high frequency side are changed to zero when coding a large block having 64*64 pixels is performed for a 4K image or the like (for example, Non-Patent Document 2).

CITATION LIST

Non-Patent Document

Non-Patent Document 1: Marta Karczewicz, et all., "Rate Distortion Optimized Quantization", ITU-Telecommunication Standardization Sector STUDY GROUP 16 Question 6, Video Coding Expert Group (VCEG), 34th Meeting: Antalya Turkey, 12-13 Jan. 2008

Non-Patent Document 2: Jianle Chen, et al., "Argorithm description for Versatile Video Coding and Test Molel 3 (VTM 3)", Joint Video Experts Team (JVET) of ITU-T SG 16 WP 3 and ISO/IECJTC 1/SC 29/WG 11, 12th Meeting, Macao, CN, 3-12 Oct. 2018

SUMMARY OF THE INVENTION

Problems to be Solved by the Invention

In order to determine the optimum quantization coefficient, the RDOQ determines an optimum quantization coefficient while changing the quantization coefficient obtained when the orthogonal transformation coefficient is quantized by performing an iterative operation. Thus, it has been difficult to perform parallel processing, and there has been a problem that hardware implementability is low.

Accordingly, the present disclosure proposes an information processing device, an information processing method, and a program capable of determining a correct quantization coefficient at low calculation cost.

SOLUTIONS TO PROBLEMS

In order to solve the above problem, an information processing device according to an aspect of the present disclosure is an information processing device including a quantization processing unit that divides a coding target image into blocks and quantizes thereon, and a coefficient change unit that changes a coefficient value in a specific frequency range among respective quantization coefficients calculated by quantization.

BRIEF DESCRIPTION OF DRAWINGS

FIG. 6 is a diagram describing a method of transmitting information indicating whether non-zero coefficients are stored in each sub-block of a matrix in which quantization coefficients are stored.

FIG. 7 is a first diagram describing a method of transmitting a position where a non-zero coefficient is stored in a sub-block.

FIG. 8 is a second diagram describing a method of transmitting a position where a non-zero coefficient is stored in a sub-block.

FIG. 9 is a diagram describing a method of transmitting a size of a quantization coefficient stored in a sub-block.

FIG. 10 is a diagram illustrating an example of a relationship between a size of a quantization coefficient stored in a sub-block and information to be transmitted.

FIG. 16 is a diagram describing a method for correcting the quantization coefficient in the second embodiment.

FIG. 19 is a diagram describing a method of correcting quantization coefficients in modification example 1 of the second embodiment.

FIG. 23 is a functional block diagram illustrating an example of a functional configuration of a quantization unit according to a third embodiment.

FIG. 24 is a diagram describing a method of correcting quantization coefficients in the third embodiment.

MODE FOR CARRYING OUT THE INVENTION

Figure 1:
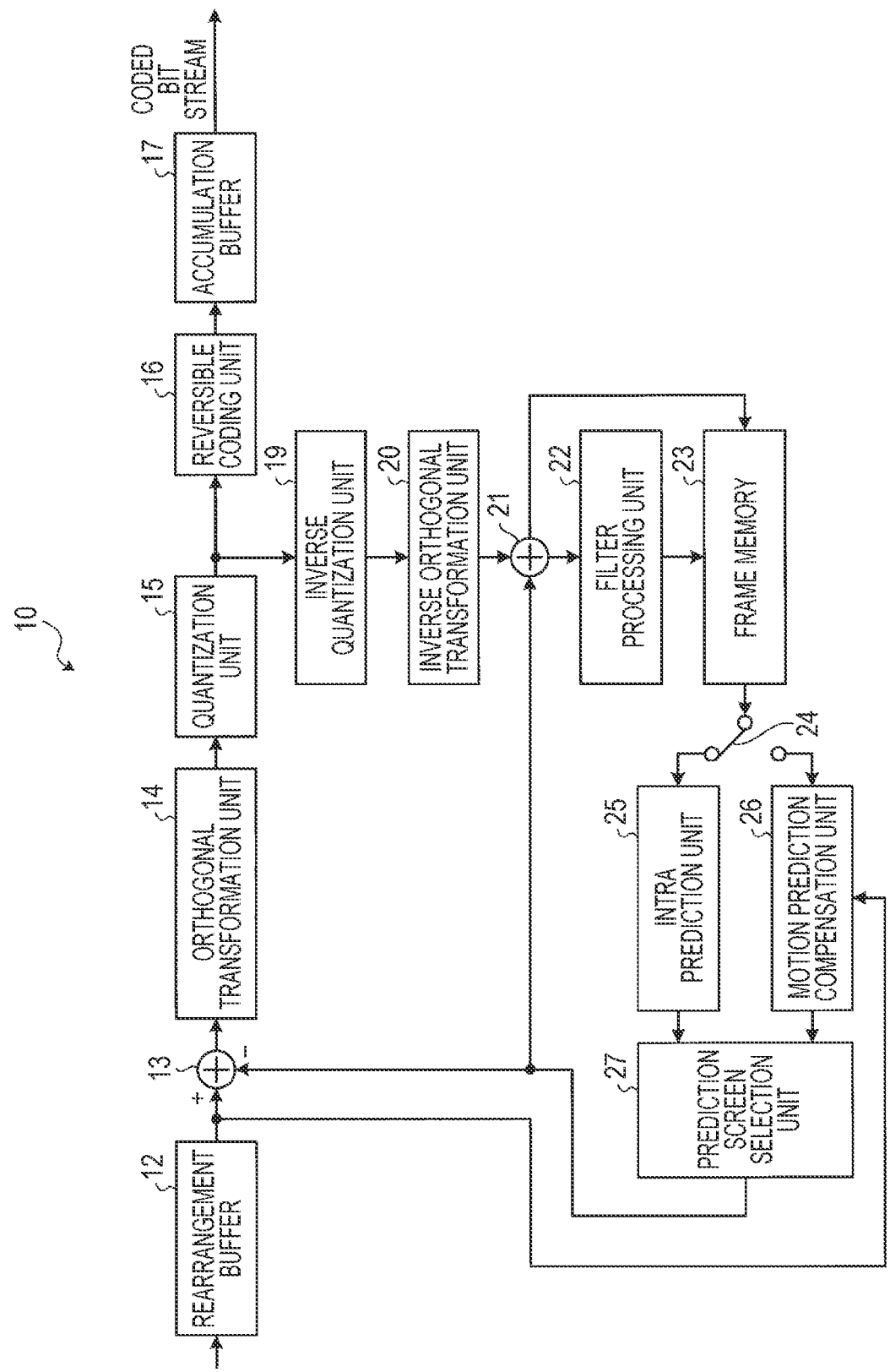
FIG. 1 is a diagram illustrating a configuration of an image coding device of the present disclosure.

Hereinafter, embodiments of the present disclosure will be described in detail on the basis of the drawings. Note that in each of the following embodiments, the same parts are denoted by the same reference numerals, and redundant description will be omitted.

Furthermore, the present disclosure will be described according to the following order of items.

1. First Embodiment 1-1. Configuration of image coding device
1-2. Operation of image coding device
1-3. Description of comparative example (operation of conventional quantization unit)
1-4. Functional configuration of quantization unit of present disclosure
1-5. Method for transmitting coefficient
1-6. Operation of quantization unit of present disclosure
1-7. Flow of processing of quantization unit
1-8. Effects of first embodiment
1-9. Modification example of first embodiment
1-10. Flow of processing of modification example of first embodiment
1-11. Effects of modification example of first embodiment 2. Second Embodiment 2-1. Functional configuration of quantization unit
2-2. Operation of quantization unit
2-3. Flow of processing of quantization unit
2-4. Effects of second embodiment
2-5. Modification example 1 of second embodiment
2-6. Effects of modification example 1 of second embodiment
2-7. Modification example 2 of second embodiment
2-8. Effects of modification example 2 of second embodiment 3. Third Embodiment 3-1. Functional configuration of quantization unit
3-2. Operation of quantization unit
3-3. Flow of processing of quantization unit
3-4. Effects of third embodiment 4. Fourth Embodiment 4-1. Functional configuration of quantization unit
4-2. Flow of processing of quantization unit
4-3. Effects of fourth embodiment 5. Description of Hardware Configuration 5-1. Description of computer to which present disclosure is applied 1. First Embodiment In the conventional HFVC, when rate-distortion optimum quantization (RDOQ) is executed, iterative operation for minimizing coding cost based on coding distortion and generated bits of a decoded image has been performed. In this iterative operation, because the operation order and the number of operations are different depending on the state of the image, it is difficult to perform parallel processing, and hardware implementability is low.

Thus, it has been an object to achieve a processing method with lower calculation cost and higher hardware implementability.

A first embodiment of the present disclosure is an example of an image coding device 10 including a function of correcting a quantization coefficient in a sub-block (coding block) which is a basic unit of coding. Note that the image coding device 10 is an example of an information processing device in the present disclosure. Note that the sub-block is an example of a block in the present disclosure.

1-1. Configuration of Image Coding Device

FIG. 1 is a diagram illustrating a configuration of an image coding device of the present disclosure. The image coding device 10 includes a rearrangement buffer 12, a subtraction unit 13, an orthogonal transformation unit 14, a quantization unit 15, a reversible coding unit 16, and an accumulation buffer 17. Moreover, the image coding device 10 further includes an inverse quantization unit 19, an inverse orthogonal transformation unit 20, an addition unit 21, a filter processing unit 22, a frame memory 23, a selector 24, an intra prediction unit 25, a motion prediction compensation unit 26, and a prediction image selection unit 27.

The rearrangement buffer 12 rearranges frames of a series of images constituting a video to be coded according to a group of pictures (GOP) structure related to coding processing, and outputs image data after rearrangement to the subtraction unit 13 and the motion prediction compensation unit 26.

The subtraction unit 13 is supplied with the image data output from the rearrangement buffer 12 and prediction image data selected by the prediction image selection unit 27 as described later. The subtraction unit 13 calculates prediction error data that is a difference between the image data output from the rearrangement buffer 12 and the prediction image data supplied from the prediction image selection unit 27, and outputs the prediction error data to the orthogonal transformation unit 14.

The orthogonal transformation unit 14 performs orthogonal transformation processing such as discrete cosine transformation (DCT) on the prediction error data output from the subtraction unit 13, or Karhunen-Loeve (KL) transformation. The orthogonal transformation unit 14 outputs transformation coefficient data obtained by performing the orthogonal transformation processing to the quantization unit 15.

The transformation coefficient data output from the orthogonal transformation unit 14 is supplied to the quantization unit 15. The quantization unit 15 quantizes the transformation coefficient data and outputs quantized data to the reversible coding unit 16 and the inverse quantization unit 19.

The reversible coding unit 16 is supplied with the quantized data output from the quantization unit 15 and prediction mode information from the intra prediction unit 25, the motion prediction compensation unit 26, and the prediction image selection unit 27 as described later. Note that the prediction mode information includes a macroblock type, a prediction mode, motion vector information, reference picture information, and the like that enable identification of a prediction block size according to intra prediction or inter prediction. The reversible coding unit 16 performs reversible coding processing on the quantized data by, for example, variable-length coding, arithmetic coding, or the like, generates a coded bit stream, and outputs the coded bit stream to the accumulation buffer 17. Furthermore, the reversible coding unit 16 also performs reversible coding on the prediction mode information, and adds the prediction mode information to header information of the coded bit stream.

The accumulation buffer 17 accumulates the coded bit stream output from the reversible coding unit 16. Furthermore, the accumulation buffer 17 outputs the accumulated coded bit stream at a transmission speed corresponding to a transmission path.

The inverse quantization unit 19 performs inverse quantization processing of the quantized data supplied from the quantization unit 15. The inverse quantization unit 19 outputs transformation coefficient data obtained by performing the inverse quantization processing to the inverse orthogonal transformation unit 20.

The inverse orthogonal transformation unit 20 performs inverse orthogonal transformation processing on the transformation coefficient data supplied from the inverse quantization unit 19 to restore a prediction error. The inverse orthogonal transformation unit 20 outputs data obtained by the inverse orthogonal transformation processing to the addition unit 21.

The addition unit 21 adds prediction error data supplied from the inverse orthogonal transformation unit 20 and the prediction image data supplied from the prediction image selection unit 27 to generate decoded image data, and outputs the decoded image data to the filter processing unit 22.

The filter processing unit 22 applies a series of filter processing for the purpose of improving image quality of the decoded image. For example, the filter processing unit includes four filters (bilateral filter, deblocking filter, adaptive offset filter, and adaptive loop filter). In the filter processing, four or one of them may be selectively applied.

The frame memory 23 retains a decoded image before the filter processing input from the addition unit 21 and the decoded image data after the filter processing supplied from the filter processing unit 22 using a recording medium.

The selector 24 reads the decoded image data before the filter processing from the frame memory 23 in order to perform intra prediction, and supplies the read decoded image data to the intra prediction unit 25 as reference image data. Furthermore, the selector 24 reads the decoded image after the filter processing from the frame memory 23 in order to perform inter prediction, and supplies the read decoded image data to the motion prediction compensation unit 26 as reference image data.

The intra prediction unit 25 uses the reference image data before the filter processing read from the frame memory 23 to perform intra prediction processing in all candidate intra prediction modes. Moreover, the intra prediction unit 25 calculates a cost function value for each intra prediction mode, and selects, as an optimum intra prediction mode, an intra prediction mode having the smallest calculated cost function value, that is, an intra prediction mode with the best coding efficiency. The intra prediction unit 25 outputs the prediction image data generated in the optimum intra prediction mode and the prediction mode information regarding the optimum intra prediction mode, and the cost function value in the optimum intra prediction mode to the prediction image selection unit 27.

The motion prediction compensation unit 26 performs motion prediction and compensation processing on the basis of the image data of a coding target image output from the rearrangement buffer 12 and the reference image data read from the frame memory 23. The motion prediction compensation unit 26 detects a motion vector for each image of each prediction block size in the coding target image read from the rearrangement buffer 12, using the reference image data after the filter processing read from the frame memory 23. Moreover, the motion prediction compensation unit 26 performs motion compensation processing on the decoded image on the basis of the detected motion vector to generate a prediction image. Furthermore, the motion prediction compensation unit 26 calculates a cost function value for each prediction block size, and selects, as an optimum inter prediction mode, a prediction block size having the smallest calculated cost function value, that is, a prediction block size with the best coding efficiency. The motion prediction compensation unit 26 outputs the prediction image data generated in the optimum inter prediction mode and the prediction mode information regarding the optimum inter prediction mode, and the cost function value in the optimum inter prediction mode to the prediction image selection unit 27.

The prediction image selection unit 27 compares the cost function value supplied from the intra prediction unit 25 with the cost function value supplied from the motion prediction compensation unit 26 in units of blocks, and selects one with a smaller cost function value as an optimum mode with the best coding efficiency. Furthermore, the prediction image selection unit 27 outputs the prediction image data generated in the optimum mode to the subtraction unit 13 and the addition unit 21. Moreover, the prediction image selection unit 27 outputs the prediction mode information of the optimum mode to the reversible coding unit 16. Note that the prediction image selection unit 27 may perform the intra prediction or inter prediction in units of slices.

1-2. Operation of Image Coding Device

Figure 2:
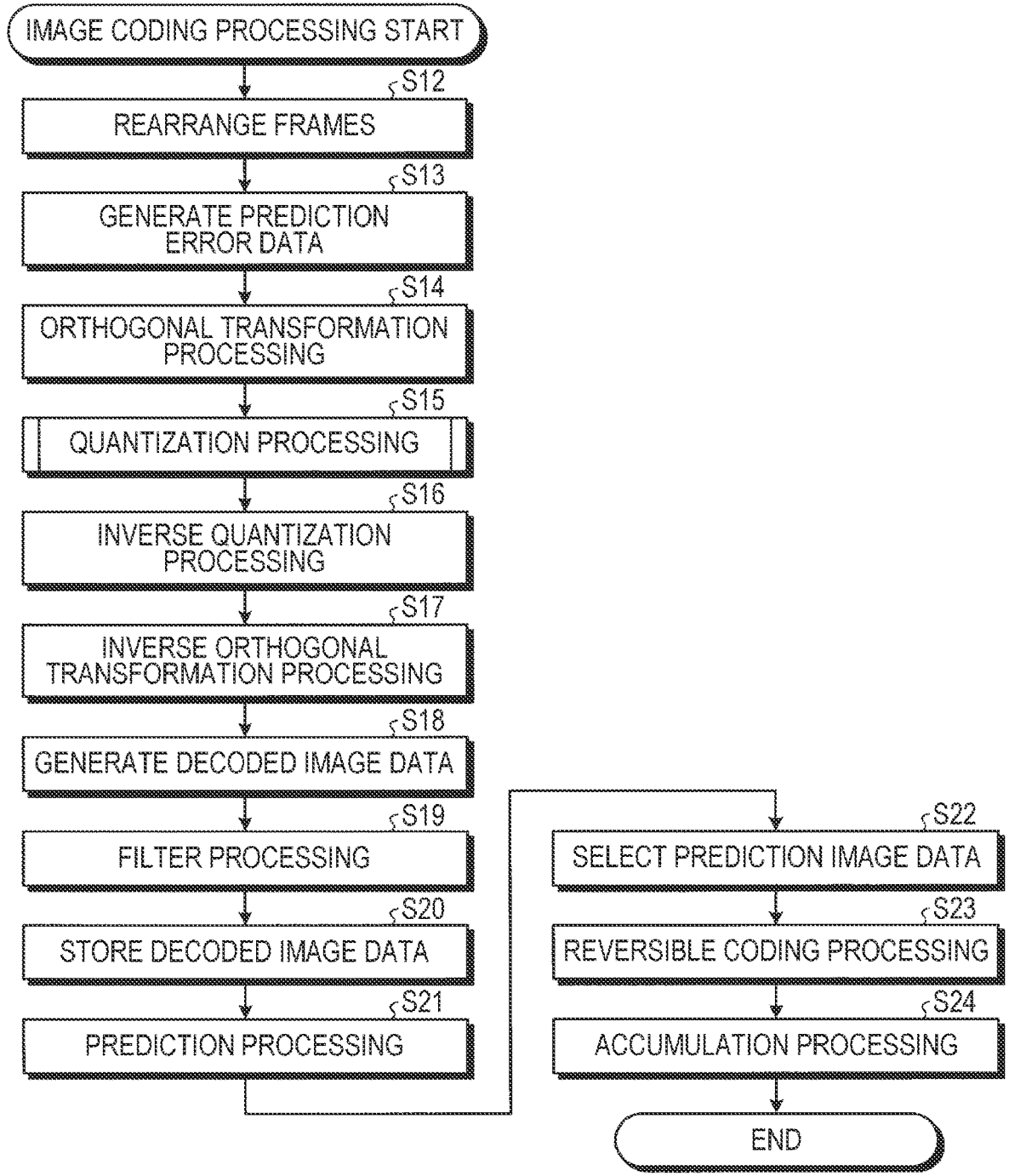
FIG. 2 is a flowchart illustrating a flow of image coding processing.

FIG. 2 is a flowchart illustrating a flow of image coding processing.

In step S12, the rearrangement buffer 12 rearranges frames. The rearrangement buffer 12 stores the image data supplied from an A-D conversion unit 11, and performs rearrangement from the display order of each picture to the coding order.

In step S13, the subtraction unit 13 generates prediction error data. The subtraction unit 13 calculates a difference between the image data of the frames rearranged in step S12 and the prediction image data selected by the prediction image selection unit 27 to generate the prediction error data. The prediction error data has a smaller data amount than the original image data. Therefore, the amount of data can be compressed as compared with a case where an image is coded as it is.

In step S14, the orthogonal transformation unit 14 performs the orthogonal transformation processing. The orthogonal transformation unit 14 orthogonally transforms the prediction error data output from the subtraction unit 13. Specifically, orthogonal transformation such as discrete cosine transformation or Karhunen-Loeve transformation is performed on the prediction error data, and the transformation coefficient data is output.

Figure 12:
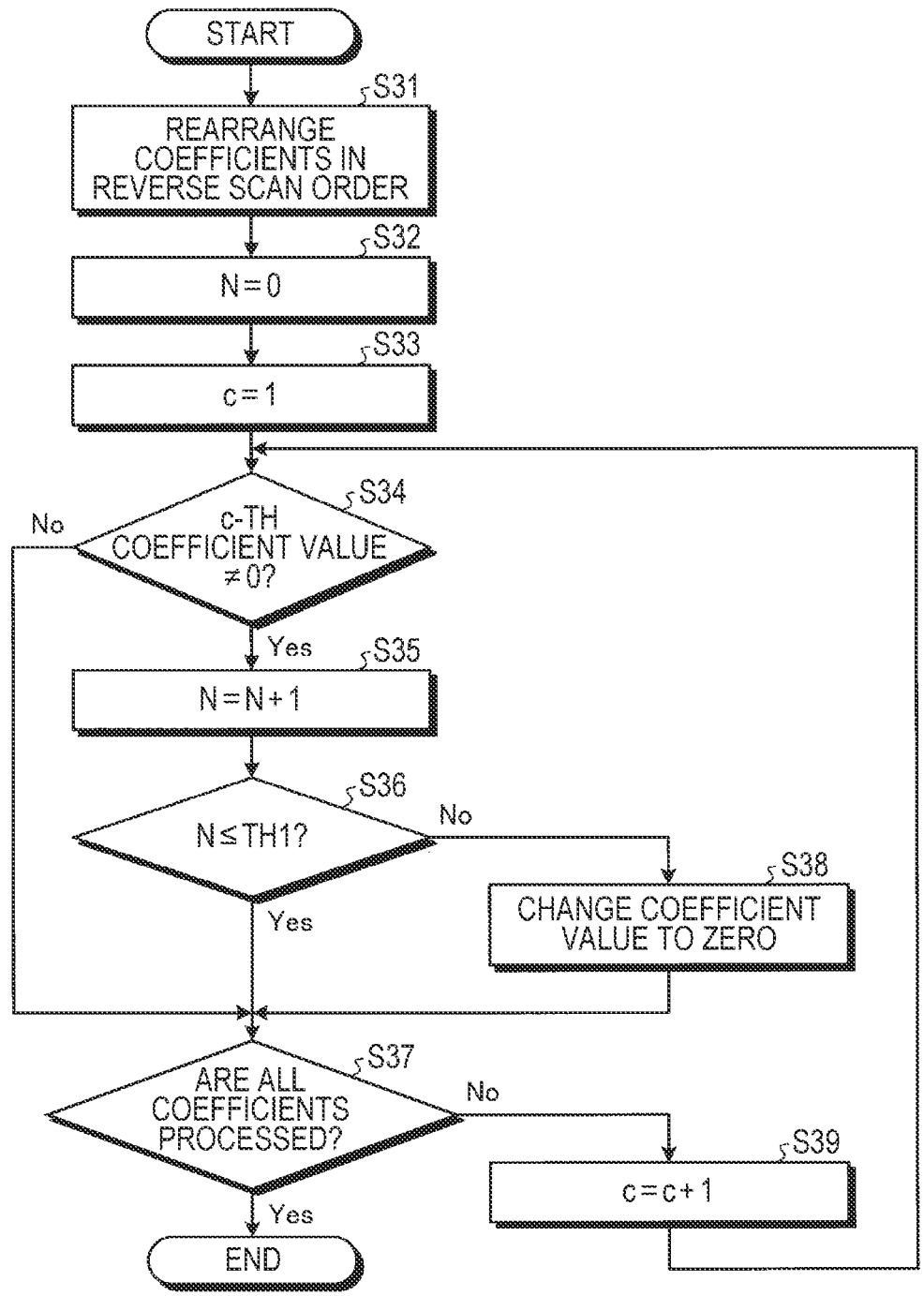
FIG. 12 is a flowchart illustrating an example of a flow of processing of correcting quantization coefficients in the first embodiment.

In step S15, the quantization unit 15 performs quantization processing. The quantization unit 15 quantizes the transformation coefficient data. Note that contents of the processing performed by the quantization unit 15 will be described later in detail (FIG. 12).

In step S16, the inverse quantization unit 19 performs the inverse quantization processing. The inverse quantization unit 19 inversely quantizes the transformation coefficient data quantized by the quantization unit 15 with a characteristic corresponding to a quantization characteristic of the quantization unit 15.

In step S17, the inverse orthogonal transformation unit 20 performs the inverse orthogonal transformation processing. The inverse orthogonal transformation unit 20 inversely orthogonally transforms the transformation coefficient data inversely quantized by the inverse quantization unit 19 with a characteristic corresponding to a transformation characteristic of the orthogonal transformation unit 14.

In step S18, the addition unit 21 generates the decoded image data. The addition unit 21 adds the prediction image data supplied from the prediction image selection unit 27 and the image data after the inverse orthogonal transformation of a position corresponding to the prediction image data to generate the decoded image data.

In step S19, the filter processing unit 22 performs filter processing. For example, the filter processing unit 22 causes the deblocking filter to operate on the decoded image data output from the addition unit 21 to remove block noise.

In step S20, the frame memory 23 stores the decoded image data. The frame memory 23 stores the decoded image data before the deblocking filter processing.

In step S21, the intra prediction unit 25 and the motion prediction compensation unit 26 each perform prediction processing. That is, the intra prediction unit 25 performs the intra prediction processing in an intra prediction mode, and the motion prediction compensation unit 26 performs motion prediction and compensation processing in the inter prediction mode. By this processing, the prediction processing in each of all prediction modes to be candidates is performed, and the cost function value in each of all the prediction modes to be candidates is calculated. Then, the optimum intra prediction mode and the optimum inter prediction mode are selected on the basis of the calculated cost function value, and the prediction image generated in the selected prediction mode and a cost function and the prediction mode information thereof are supplied to the prediction image selection unit 27.

In step S22, the prediction image selection unit 27 selects the prediction image data. On the basis of the respective cost function values output from the intra prediction unit 25 and the motion prediction compensation unit 26, the prediction image selection unit 27 determines the optimum mode with the best coding efficiency. Moreover, the prediction image selection unit 27 selects the prediction image data of the determined optimum mode, and supplies the prediction image data to the subtraction unit 13 and the addition unit 21. As described above, this prediction image is used in the processing of steps S13 and S18.

In step S23, the reversible coding unit 16 performs the reversible coding processing. The reversible coding unit 16 performs the reversible coding on the quantized data output from the quantization unit 15. That is, the reversible coding such as variable-length coding or arithmetic coding is performed on the quantized data, and the data is compressed. At this time, the prediction mode information (including macroblock type, prediction mode, motion vector information, reference picture information, and the like, for example) and the like input to the reversible coding unit 16 in step S22 described above are also subjected to the reversible coding. Moreover, reversibly coded data of the prediction mode information is added to the header information of the coded bit stream generated by the reversible coding of the quantized data.

In step S24, the accumulation buffer 17 performs accumulation processing of accumulating coded bit streams. The coded bit streams accumulated in the accumulation buffer 17 are appropriately read and transmitted to the decoding side via a transmission path.

1-3. Description of Comparative Example

Figure 3:
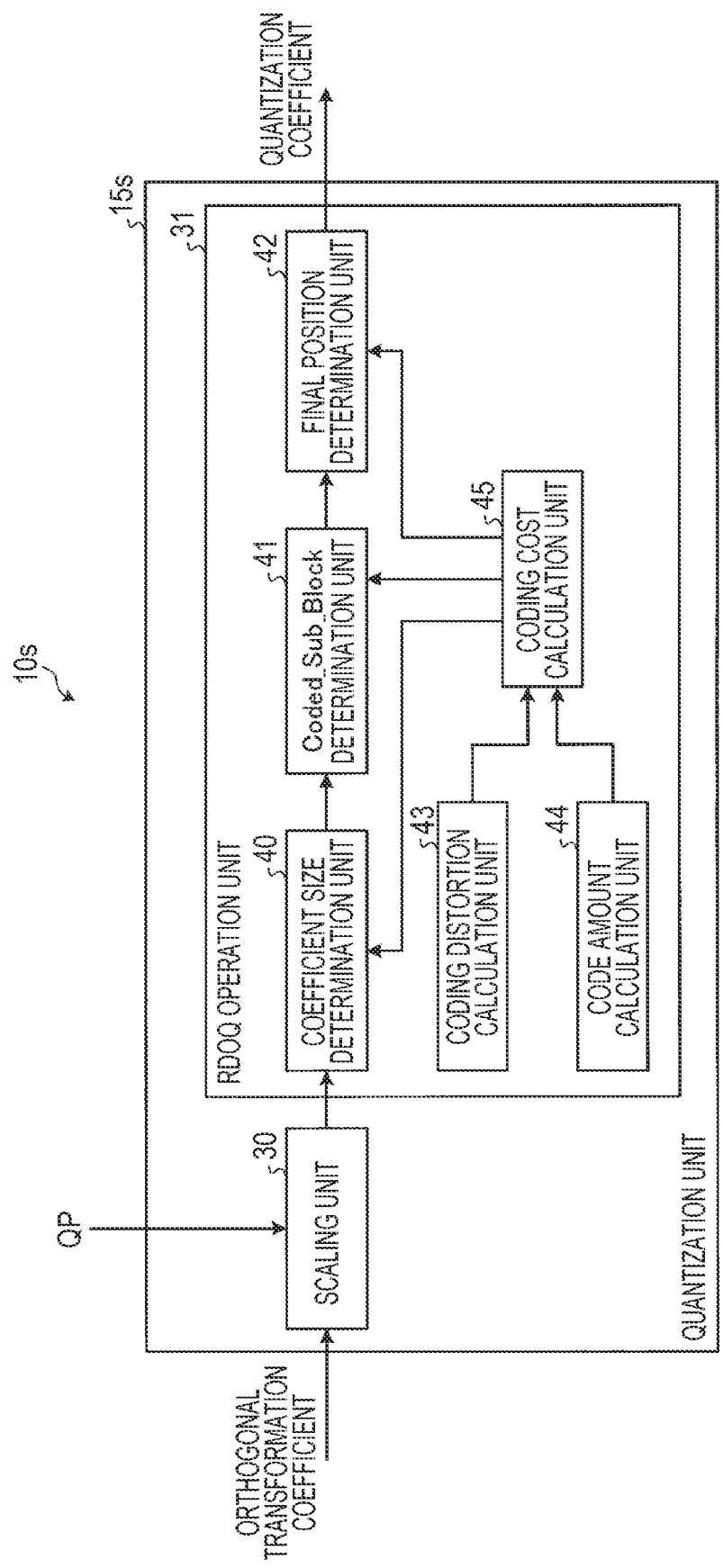
FIG. 3 is a functional block diagram illustrating a functional configuration of a quantization unit of a conventional image coding device.

Next, functions and operations of a quantization unit 15$s$ of a conventional image coding device 10$s$ will be briefly described as a comparative example. FIG. 3 is a functional block diagram illustrating a functional configuration of the quantization unit 15$s$ of the conventional image coding device 10$s$. For example, in an HEVC Test Model (HM) that is a reference encoder of the HEVC, the quantization unit 15$s$ includes a scaling unit 30 and an RDOQ operation unit 31 as illustrated in FIG. 3.

The scaling unit 30 performs quantization for obtaining a quantized transformation coefficient (quantization coefficient) for a coding target image divided into blocks. Specifically, the scaling unit 30 obtains the quantization coefficient by dividing the orthogonal transformation coefficient obtained by applying the orthogonal transformation such as the DCT by a quantization table storing a quantization parameter QP. The quantization parameter QP is a value indicating a quantization width (step) for each frequency, and the larger the quantization parameter QP, the higher the compression rate but the lower the image quality. Note that the scaling unit 30 is an example of a quantization processing unit.

The RDOQ operation unit 31 selects an optimum quantization coefficient for each block. Specifically, the RDOQ operation unit 31 changes a residual signal between the decoded image restored on the basis of a result of quantization and the original image to correct the balance between the coding distortion and the generated bit.

The RDOQ operation unit 31 further includes a coefficient size determination unit 40, a Coded Sub Block determination unit 41, a final position determination unit 42, a coding distortion calculation unit 43, a code amount calculation unit 44, and a coding cost calculation unit 45.

The coefficient size determination unit 40 corrects the sizes of coefficients stored in each sub-block when a matrix storing quantization coefficients is divided into 4*4 sub-blocks. Specifically, on the basis of a coding cost Jp as described later, which is calculated by the coding cost calculation unit 45, the coefficient size determination unit 40 changes the sizes of the coefficients such that the coding cost Jp becomes smaller.

The Coded Sub Block determination unit 41 determines, in units of sub-blocks, whether all the quantization coefficients in the sub-block of interest are set to zero.

The final position determination unit 42 performs zigzag scanning on the matrix storing the quantization coefficients from a high frequency side toward a low frequency side to obtain a first position (position on the highest frequency side) storing the coefficients other than zero (hereinafter referred to as a non-zero coefficient).

The coding distortion calculation unit 43 calculates a degree of difference (coding distortion Dp) between the original image and the decoded image when the original image is coded by a quantization matrix storing quantization coefficients of a coefficient pattern p by, for example, obtaining a sum total of square errors, that is, sum square difference (SSD). Specifically, the coding distortion Dp is calculated by the sum total of squared errors between the decoded image data generated by the addition unit 21 (FIG. 1) and the original image. The coding distortion Dp is desirably small.

The code amount calculation unit 44 acquires, from the reversible coding unit 16, the generated bits Rp when the original image is coded by the quantization matrix storing the quantization coefficients of the coefficient pattern p. The reversible coding unit 16 performs binarization processing and arithmetic coding processing on the quantization coefficient calculated by the quantization unit 15. In the binarization processing, syntax information to be coded is converted into binary information of "0/1" using, for example, an Unary code, an Exponential Golomb code, or the like. The arithmetic coding processing performs coding on the basis of an appearance probability of the binary information. For example, when coding n-bit binary information, there are $2^n$ input bit strings. Then, sections included in [0, 1) are allocated to respective bit strings so as not to overlap each other. For example, in a case where n=3 there are eight bit strings of 000, 001, 010, 011, 100, 101, 110, and 111. At this time, probability sections $a_{001}$, $a_{010}$, ..., and $a_{011}$ satisfying $0 < a_{001} < a_{010} < \ldots < a_{011} < 1$ are set according to the appearance probability of the respective bit strings, and half-open sections $[0, a_{001})$, $[a_{001}, a_{010})$, $[a_{010}, a_{011})$, ..., $[a_{110}, a_{111})$, and $[a_{111}, 1)$ are associated with the respective bit strings. The generated bit Rp is a bit depth of the coded bit stream generated by the arithmetic coding processing, and the smaller the generated bit Rp, the smaller the information amount.

The coding cost calculation unit 45 calculates the coding cost Jp represented by the coding distortion Dp and the generated bit Rp. Furthermore, the coding cost calculation unit 45 obtains a condition under which the coding cost Jp is minimized when the coefficient pattern p is changed, that is, a condition under which coding is performed in which a trade-off between the coding distortion Dp and the generated bit Rp is optimum.

The rate-distortion optimum quantization performs selection to minimize the coding cost Jp represented by the coding distortion Dp of the decoded image, the generated bit Rp, and the Lagrange multiplier λ. That is, in the rate-distortion optimum quantization, the quantization condition that minimizes the coding cost Jp considering both the coding distortion Dp and the generated bit Rp is determined. The coding cost Jp is expressed by, for example, Equation (1).

$$Jp = Dp + \lambda * Rp \tag{1}$$

Processing of rate-distortion correction is performed for each orthogonal transformation coefficient in order from the low frequency side of the matrix (for example, the matrix A in FIG. 5) storing the quantization coefficients. The image coding device 10 sets a plurality of candidates for a quantization coefficient for the orthogonal transformation coefficient of interest, and calculates the coding cost Jp for each of the set candidates according to Equation (1). For example, in a case where the quantization coefficient corresponding to the orthogonal transformation coefficient of interest is K, all the coding costs Jp when the quantization coefficient is changed from K to zero are calculated. The image coding device 10 sets the candidate having the minimum coding cost Jp as the quantization coefficient for the orthogonal transformation coefficient of interest.

As described above, since the processing of rate-distortion correction is performed by the iterative operation, that is, atypical processing, it has been difficult to implement the processing of rate-distortion correction in hardware. Thus, although the processing of rate-distortion correction is implemented by software, it has been desired to increase the speed of the process since the calculation cost is high.

1-4. Functional Configuration of Quantization Unit of Present Disclosure

Figure 4:
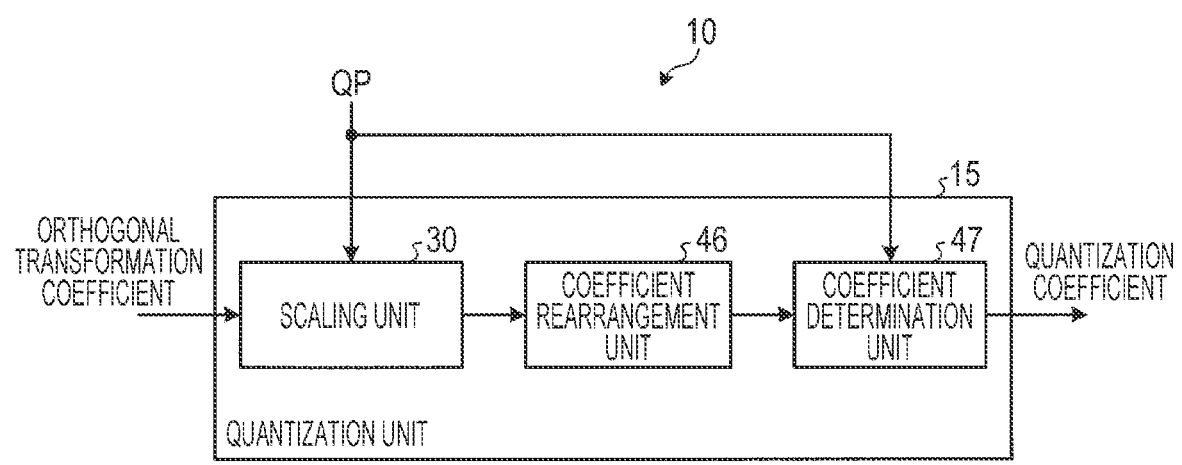
FIG. 4 is a functional block diagram illustrating an example of a functional configuration of the quantization unit according to a first embodiment.

FIG. 4 is a functional block diagram illustrating an example of a functional configuration of the quantization unit 15 according to the first embodiment. The quantization unit 15 includes the scaling unit 30 (quantization processing unit), a coefficient rearrangement unit 46, and a coefficient determination unit 47. Note that the function of the scaling unit 30 is as described above.

The coefficient rearrangement unit 46 rearranges the respective quantization coefficients stored in the sub-blocks by the scaling unit 30 in the order from the low frequency side to the high frequency side.

The coefficient determination unit 47 changes the coefficient value in a specific frequency range among the respective quantization coefficients calculated by the scaling unit 30 through quantization to zero. Specifically, the coefficient determination unit 47 changes the coefficient value in the specific frequency range among the quantization coefficients rearranged by the coefficient rearrangement unit 46 to zero. Note that the coefficient rearrangement unit 46 and the coefficient determination unit 47 are examples of a coefficient change unit. Furthermore, the coefficient rearrangement unit 46 and the coefficient determination unit 47 are extensions of the function of the final position determination unit 42 in FIG. 3.

1-5. Method for Transmitting Coefficient

Before describing the operation of the quantization unit 15, a method for transmitting a quantization coefficient when the quantization unit 15 performs various operations will be described using FIGS. 5 to 10.

Figure 5:
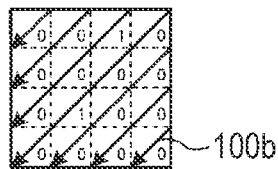
FIG. 5 is a diagram illustrating an example of a matrix in which quantization coefficients are stored.

FIG. 5 is a diagram illustrating an example of a matrix A in which quantization coefficients are stored. At an upper left side of the matrix A, a quantization coefficient related to a component on the low frequency side is stored. Then, at a lower right side of the matrix A, a quantization coefficient related to a component on the high frequency side is stored. Then, the matrix A is further divided into 4*4 sub-blocks (#0 to #15). Note that the position of an arbitrary element in the matrix A is represented by (i, j). i represents a position in a row direction, and j represents a position in a column direction. That is, in the matrix A, the position of the element at the upper left corner is represented by (0, 0), and the position of the element at the lower right corner is represented by (15, 15).

The quantization unit 15 performs zigzag scanning for each sub-block (#0 to #15) along a scan order 100a from a lower right sub-block #0 (high frequency side) toward an upper left sub-block #15 (low frequency side), and refers to values of coefficients stored in each sub-block. Note that the RDOQ operation unit 31 refers to values of coefficients by performing zigzag scanning along the scan order 100b from the lower right toward the upper left also in each sub-block, as illustrated in sub-block #7 of FIG. 5. Then, in the matrix A in FIG. 5, it can be seen that the final position where a non-zero coefficient is stored is P (9, 6).

FIG. 6 is a diagram describing a method of transmitting information (coded_sub_block_flag) indicating whether non-zero coefficients are stored in each sub-block (#0 to #15) of the matrix A in which the quantization coefficients are stored.

In FIG. 6, a matrix B is information indicating whether a non-zero coefficient is stored in each sub-block (#0 to #15) of the matrix A. In FIG. 6, "1" indicates that a non-zero coefficient is stored in the sub-block. "0" indicates that zeros are stored in the entire sub-block. Furthermore, "(1)" indicates the final position where the coefficient is stored.

A table Tb1 in FIG. 6 is a table (syntax information) indicating a transmission order of coded sub block flag indicating whether the non-zero coefficient is stored in each sub-block (#0 to #15). Note that it is already known that the non-zero coefficient is stored in the sub-block #7, and thus coded_sub_block_flag is not transmitted for the sub-block #7 in order to suppress the transmission amount.

FIG. 7 is a first diagram describing a method of transmitting a position where a non-zero coefficient is stored in a sub-block. In particular, FIG. 7 is a diagram describing a method of transmitting a position where a non-zero coefficient is stored in the sub-block #7 including the final position where the coefficient is stored in the matrix A.

A table Tb2 in FIG. 7 is a table (syntax information) indicating Sig_Coeff_flag indicating a storage position of the non-zero coefficient in the sub-block #7. That is, the table Tb2 in FIG. 7 indicates that non-zero coefficients are stored at a position of a coding order "8" and a position of a coding order "10". Note that for the position of the coding order "8", it has already been transmitted that it is the final position of the coefficient, and thus nothing is transmitted in the table Tb2 in order to suppress the amount of transmission.

FIG. 8 is a second diagram describing a method of transmitting a position where a non-zero coefficient is stored in a sub-block. In particular, FIG. 8 is a diagram describing a method of transmitting a position where a non-zero coefficient is stored in the sub-block #10 in the matrix A.

A table Tb3 in FIG. 8 is a table (syntax information) indicating Sig_Coeff_flag indicating a storage position of the non-zero coefficient in sub-block #10. That is, the table Tb3 of FIG. 7 indicates that the non-zero coefficient is stored at a position of a coding order "2" and a position of a coding order "15".

FIG. 9 is a diagram describing a method of transmitting a size of a quantization coefficient stored in a sub-block. In particular, FIG. 9 is a diagram describing a method of transmitting a size of a quantization coefficient stored in the sub-block #7 of the matrix A.

A table Tb4 in FIG. 9 is a table indicating respective pieces of information of coeff_abs_level_greater1, coeff_abs_level_greater2, coeff_abs_level_remain, and coeff_sign_flag indicating the size of the quantization coefficient in the sub-block #7.

coeff_abs_level_greater1 transmits one in a case where the coefficient is greater than one, and transmits zero in a case where the coefficient is equal to or less than one. coeff_abs_level_greater2 transmits one in a case where the coefficient is greater than two, and transmits zero in a case where the coefficient is equal to or less than two. coeff_abs_level_remain transmits a difference value from coeff_abs_level_greater2 in a case where the coefficient is greater than two. coeff_sign_flag represents the sign of the coefficient, and transmits one when the sign of the coefficient is minus and zero when the sign of the coefficient is plus.

FIG. 10 is a diagram illustrating an example of a relationship between a size of a quantization coefficient stored in a sub-block and information to be transmitted.

A table Tb5 in FIG. 10 illustrates an example of syntax information when a size of a coefficient is transmitted in each case where the coefficients stored in the quantization matrix are zero to six. For example, in a case where the coefficient is six, Sig_Coeff_flag=1, coeff_abs_level_greater1=1, coeff_abs_level_greater2=1, coeff_abs_level_remain=6−3=3, and coeff_sign_flag=0 are transmitted.

1-6. Operation of Quantization Unit of Present Disclosure

Figure 11:
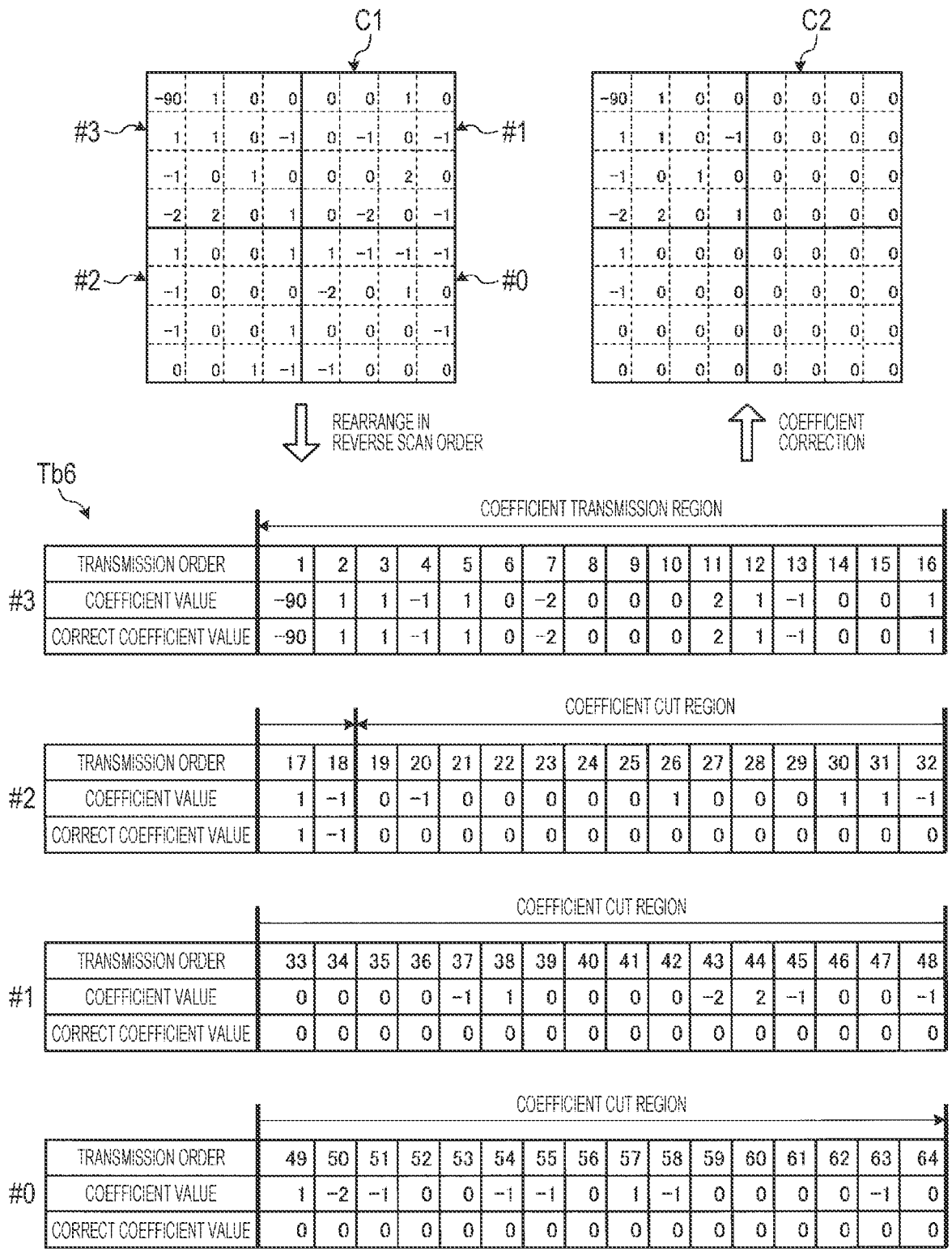
FIG. 11 is a diagram describing a method of determining a quantization coefficient in the first embodiment.

FIG. 11 is a diagram describing a method of determining a quantization coefficient in the first embodiment. A matrix C1 in FIG. 11 is a matrix illustrating an example of a result of quantization performed by the scaling unit 30. A matrix C2 indicates a result of correcting quantization coefficients of the matrix C1 by the coefficient determination unit 47.

The coefficient determination unit 47 refers to a result obtained by the coefficient rearrangement unit 46 rearranging the respective coefficients of the matrix C1 in the order from the low frequency side to the high frequency side (that is, reverse scan order) for each sub-block, and changes the coefficients in a specific range to zero. Specifically, as illustrated in a table Tb6 in FIG. 11, the coefficients of the matrix C1 are each rearranged in the order of the sub-blocks #3, #2 , #1, and #0 from the low frequency side to the high frequency side. Then, the number of appearances of non-zero coefficients is counted in the order of rearrangement.

Then, the coefficient value of the non-zero coefficient that appears after the number of appearances of the non-zero coefficient exceeds a first appearance number threshold TH1 is changed to zero.

The table Tb6 in FIG. 11 illustrates an example in a case where the first appearance number threshold TH1 is set to 12. That is, the coefficient values stored in the matrix C1 are transmitted as they are until the transmission order No. 18 in which the number of appearances of the non-zero coefficients reaches the first appearance number threshold TH1=12 (coefficient transmission region). Then, all the coefficient values at and after the transmission order No. 19 are changed to zero (coefficient cut region). The matrix C2 in FIG. 11 is a matrix in which the coefficient values are corrected by such a procedure.

Note that the value of the first appearance number threshold TH1 is desirably set according to the value of the quantization parameter QP. That is, as the quantization parameter QP is smaller, an operation of not reducing the bit depth of the original image is exerted, and thus it is desirable to transmit as many coefficients as possible. That is, it is desirable to set the first appearance number threshold TH1 to be large. Conversely, as the quantization parameter QP is larger, an operation of reducing the bit depth of the original image is exerted, and thus it is desirable to reduce the transmission amount of coefficients as small as possible. That is, it is desirable to set the first appearance number threshold TH1 to be small. Note that how to set the first appearance number threshold TH1 according to the quantization parameter QP is only required to be determined on the basis of a result of an evaluation experiment or the like.

1-7. Flow of Processing of Quantization Unit

Next, a flow of correction of quantization coefficients performed by the quantization unit 15 in the first embodiment will be described using FIG. 12. FIG. 12 is a flowchart illustrating an example of a flow of processing of correcting quantization coefficients in the first embodiment. Note that the flowchart of FIG. 12 illustrates a flow of processing after the quantization processing is completed in the scaling unit 30.

The coefficient rearrangement unit 46 rearranges the quantization coefficients in reverse scan order (step S31).

The coefficient determination unit 47 sets the number of appearances N of non-zero coefficients to zero (step S32).

The coefficient determination unit 47 sets a coefficient order c in the sub-block to be determined to one (step S33).

The coefficient determination unit 47 determines whether the c-th coefficient value is non-zero (step S34). If it is determined that the c-th coefficient value is non-zero (step S34: Yes), the processing proceeds to step S35. On the other hand, if it is not determined that the c-th coefficient value is non-zero (step S34: No), the processing proceeds to step S37.

If it is determined as Yes in step S34, the coefficient determination unit 47 increments the number of appearances N of non-zero coefficients (step S35).

Then, the coefficient determination unit 47 determines whether the number of appearances N of the non-zero coefficients is equal to or less than the first appearance number threshold TH1 (step S36). If it is determined that the number of appearances is equal to or less than the first appearance number threshold TH1 (step S36: Yes), the processing proceeds to step S37. On the other hand, if it is not determined that the number of appearances is equal to or less than the first appearance number threshold TH1 (step S36: No), the processing proceeds to step S38.

If it is determined as Yes in step S36, the coefficient determination unit 47 determines whether all the coefficients have been processed (step S37). If it is determined that all the coefficients have been processed (step S37: Yes), the processing of FIG. 12 ends. On the other hand, if it is not determined that all the coefficients have been processed (step S37: No), the processing proceeds to step S39.

The coefficient determination unit 47 increments the coefficient order c to be determined (step S39). Thereafter, the processing returns to step S34.

On the other hand, if No is determined in step S36, the coefficient determination unit 47 changes the coefficient value to zero (step S38). Thereafter, the processing proceeds to step S37.

Note that the flowchart of FIG. 12 describes an execution procedure of software. In a case where the same processing is implemented in hardware, processing for each sub-block is executed in parallel.

1-8. Effects of First Embodiment

As described above, in the image coding device 10 of the first embodiment, the scaling unit 30 (quantization processing unit) quantizes the coding target image divided into blocks. The coefficient determination unit 47 (coefficient change unit) changes a coefficient value in a specific frequency range among the quantization coefficients corresponding to respective sub-blocks calculated by the scaling unit 30 through quantization.

Thus, the image coding device 10 determines the final position of the coefficient just by counting the number of appearances of the non-zero coefficients, and thus can correct the quantization coefficients without correcting the coding distortion by the iterative operation. Therefore, efficiency of the coding processing can be improved, and hardware implementability is improved.

Furthermore, in the image coding device 10 of the first embodiment, the coefficient rearrangement unit 46 rearranges the quantization coefficients stored in the sub-block (block) in the order from the low frequency side to the high frequency side, and counts the number of appearances of non-zero coefficients (quantization coefficients that are not zero) in the rearranged order, and the coefficient determination unit 47 (coefficient change unit) changes the quantization coefficient that appears after the number of appearances exceeds the first appearance number threshold TH1 to zero.

Thus, the image coding device 10 can change the quantization coefficient in the specific frequency range to zero only by threshold processing, and therefore can correct the quantization coefficient by simple processing with low calculation cost.

Furthermore, in the image coding device 10 of the first embodiment, the first appearance number threshold TH1 is determined on the basis of the quantization parameter QP when the scaling unit 30 (quantization processing unit) performs quantization.

Thus, the image coding device 10 can correct the coefficient value according to the coding condition.

Furthermore, in the image coding device 10, since the quantization unit 15 changes the quantization coefficient only on the basis of the threshold processing without using the above-described coding cost Jp, it is possible to achieve a function equivalent to that of the conventional quantization unit 15s without providing the coding distortion calculation unit 43, the code amount calculation unit 44, and the coding cost calculation unit 45 described in FIG. 3.

1-9. Modification Example of First Embodiment

Next, an image coding device 10a (not illustrated) which is a modification example of the image coding device 10 described in the first embodiment will be described. The image coding device 10a includes a quantization unit 15a (not illustrated) instead of the quantization unit 15 (FIG. 4) described above. Then, the quantization unit 15a includes a coefficient determination unit 47a (not illustrated) having a different coefficient determination method, instead of the coefficient determination unit 47. Note that the image coding device 10a is an example of an information processing device in the present disclosure.

The coefficient determination unit 47a of the image coding device 10a includes an exceptional condition in addition to the function described in the first embodiment, that is, the function of counting the number of appearances of non-zero coefficients and changing the non-zero coefficient value that appears after the number of appearances exceeds the first appearance number threshold TH1 to zero. That is, the coefficient determination unit 47a further includes a function of not changing the coefficient value to zero in a case where a coefficient having a size exceeding the first coefficient value threshold TH2 appears after the number of appearances of the non-zero coefficients exceeds the first appearance number threshold TH1.

Figure 13:
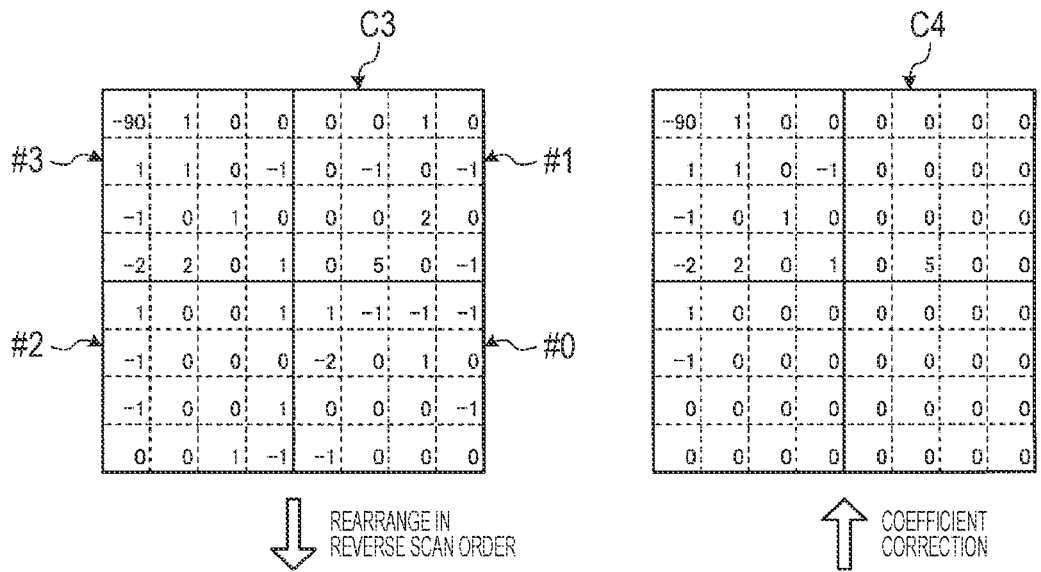
FIG. 13 is a diagram describing a method of determining a quantization coefficient in a modification example of the first embodiment.

FIG. 13 is a diagram describing a method of determining a quantization coefficient in a modification example of the first embodiment. A matrix C3 in FIG. 13 is a matrix indicating an example of a result of quantization performed by the scaling unit 30. A matrix C4 indicates a result of correcting quantization coefficients of the matrix C3 by the coefficient determination unit 47a.

In the matrix C3, an element at a position of (5, 3) is changed from −2 to 5 with respect to the matrix C1 in FIG. 11 described above. Then, for example, in a case where a coefficient having a size exceeding "3" (first coefficient value threshold TH2) appears after the first appearance number threshold TH1 is exceeded, the coefficient determination unit 47a does not change the coefficient to zero. Thus, as illustrated in a table Tb7 of FIG. 13, the coefficient "5" of the transmission order No. 43 is a coefficient that appears after the first appearance number threshold TH1=12 is exceeded, and is not changed to zero because the coefficient has a size exceeding the first coefficient value threshold TH2=3. Therefore, in the matrix C4 in which the coefficients are corrected, the coefficient "5" is stored as it is at the position of (5, 3). Note that the first coefficient value threshold TH2 is set to a value corresponding to the quantization parameter QP. That is, as the quantization parameter QP is smaller, it is more preferable to perform transmission without leaving a small protrusion value, and thus the first coefficient value threshold TH2 is set to a small value. On the other hand, it is preferable to reduce the number of coefficients to be transmitted as the quantization parameter QP increases, and thus the first coefficient value threshold TH2 is set to a large value.

1-10. Flow of Processing of Modification Example of First Embodiment

Figure 14:
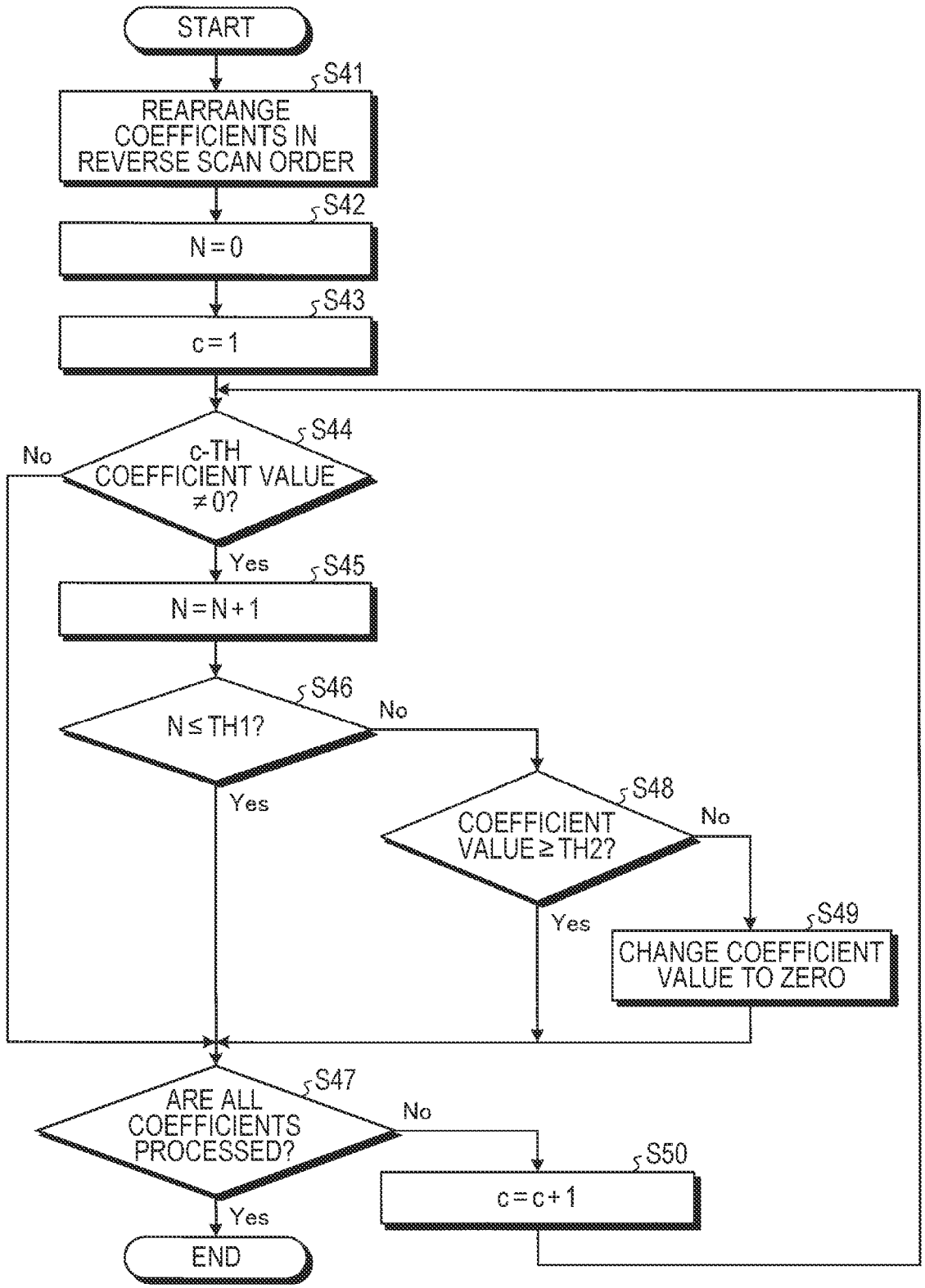
FIG. 14 is a flowchart illustrating an example of a flow of processing of correcting a quantization coefficient in a modification example of the first embodiment.

Next, a flow of correction of quantization coefficients in a modification example of the first embodiment will be described using FIG. 14. FIG. 14 is a flowchart illustrating an example of a flow of processing of correcting a quantization coefficient in a modification example of the first embodiment. Note that the flowchart of FIG. 14 illustrates a flow of processing after the quantization processing is completed in the scaling unit 30.

The flow of processing illustrated in FIG. 14 is substantially equivalent to the flow of processing described in FIG. 12. That is, the flow of processing from step S41 to step S46 in FIG. 14 is equivalent to the flow of processing from step S31 to step S36 in FIG. 12. Furthermore, the processing in steps S47 and S50 in FIG. 14 is equivalent to the processing in steps S37 and S39 in FIG. 12.

Then, in a case where it is not determined in step S46 that the number of appearances N of the non-zero coefficients is equal to or less than the first appearance number threshold TH1 (step S46: No), the coefficient determination unit 47a determines whether the coefficient value is equal to or more than the first coefficient value threshold TH2 (step S48). If it is determined that the coefficient value is equal to or more than the first coefficient value threshold TH2 (step S48: Yes), the processing proceeds to step S47. On the other hand, if it is not determined that the coefficient value is equal to or more than the first coefficient value threshold TH2 (step S48: No), the processing proceeds to step S49.

If No is determined in step S48, the coefficient determination unit 47a changes the coefficient value to zero (step S49). Thereafter, the processing proceeds to step S47.

Note that the flowchart of FIG. 14 describes an execution procedure of software. In a case where the same processing is implemented in hardware, the processing performed on each sub-block is executed in parallel.

1-11. Effects of Modification Example of First Embodiment

As described above, in the image coding device 10a of the modification example of the first embodiment, the coefficient determination unit 47a (coefficient change unit) does not change the coefficient value to zero in a case where a coefficient value having a size exceeding the first coefficient value threshold TH2 appears after the number of appearances of non-zero coefficients (quantization coefficients that are not zero) exceeds the first appearance number threshold TH1.

Thus, in a case where a large coefficient suddenly appears in the coefficient cut region, the image coding device 10a can perform coding while maintaining characteristics of the original image by also transmitting information of the coefficient.

Furthermore, in the image coding device 10a of the modification example of the first embodiment, the first coefficient value threshold TH2 is determined on the basis of the quantization parameter QP when the scaling unit 30 (quantization unit) performs quantization.

Thus, the image coding device 10a can correct the coefficient value according to the coding condition.

2. Second Embodiment

In the RDOQ, the Coded Sub Block determination unit 41 (FIG. 3) determines whether all the quantization coefficients in the sub-block are set to zero in units of sub-blocks. At this time, it is necessary to calculate the coding distortion Dp and the generated bit Rp each time by performing the iterative operation, and this point has been a problem that makes it difficult to implement the RDOQ function by hardware. Furthermore, in the discussion of the VVC standard, what is called zero out technique of changing all coefficients of the sub-blocks on the high frequency side to zero is discussed.

A second embodiment of the present disclosure is an example of an image coding device 10b having a function of correcting quantization coefficients in a sub-block.

The image coding device 10b includes a quantization unit 15b instead of the quantization unit 15 in the image coding device 10 described above. Note that the image coding device 10b is an example of an information processing device in the present disclosure.

2-1. Functional Configuration of Quantization Unit

Figure 15:
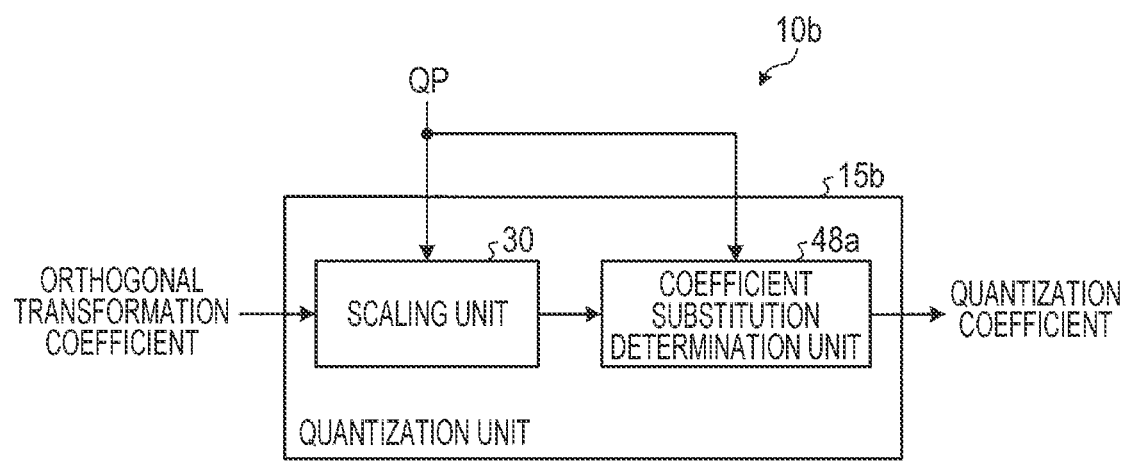
FIG. 15 is a functional block diagram illustrating an example of a functional configuration of a quantization unit according to a second embodiment.

FIG. 15 is a functional block diagram illustrating an example of a functional configuration of a quantization unit 15b according to the second embodiment. The quantization unit 15b includes the scaling unit 30 and a coefficient substitution determination unit 48a. Note that the function of the scaling unit 30 is as described above.

The coefficient substitution determination unit 48a determines whether to change all the coefficients in the sub-block to zero on the basis of the number of appearances of non-zero coefficients in the sub-block and the sizes of the coefficients. Note that the coefficient substitution determination unit 48 is an example of the coefficient change unit. Furthermore, the coefficient substitution determination unit 48a is an extension of the function of the Coded Sub Block determination unit 41 in FIG. 3.

2-2. Operation of Quantization Unit

Figure 16:
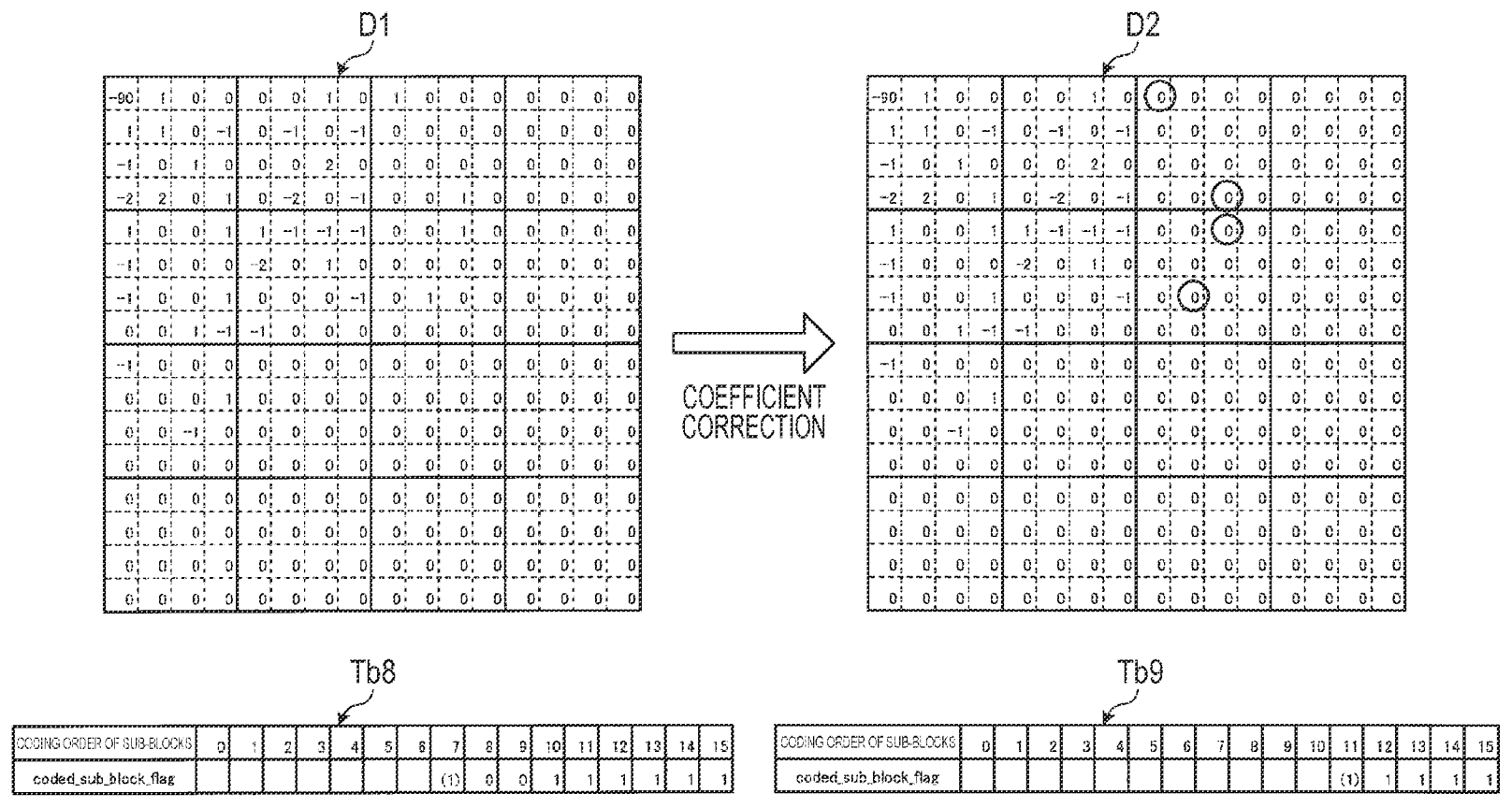

FIG. 16 is a diagram describing a method of determining the quantization coefficient in the second embodiment. A matrix D1 in FIG. 16 is a matrix illustrating an example of a result of quantization performed by the scaling unit 30. A matrix D2 indicates a result of correcting coefficients of the matrix D1 by the coefficient substitution determination unit 48a. Furthermore, a table Tb8 indicates syntax information when coded sub block flag indicating a storage position of a non-zero coefficient of the matrix D1 is transmitted. A table Tb9 indicates syntax information when coded sub block flag indicating the storage position of the non-zero coefficient of the matrix D2 is transmitted.

The coefficient substitution determination unit 48a calculates the number of non-zero coefficients and the absolute values of the coefficients for each sub-block included in the matrix D1. Then, in a case where the number of non-zero coefficients is equal to or less than a second appearance number threshold TH3 and the absolute values of the coefficients are equal to or less than a second coefficient value threshold TH4, the coefficient substitution determination unit 48a changes all the coefficients in the sub-block to zero. Note that the second appearance number threshold TH3 and the second coefficient value threshold TH4 are determined on the basis of, for example, the quantization parameter QP or the like.

For example, in a case where the second appearance number threshold TH3=3 and the second coefficient value threshold TH4=1, the coefficient substitution determination unit 48a generates the matrix D2 by correcting the coefficients of the matrix D1 in FIG. 16. In this example, the circled coefficient of the matrix D2 is changed to zero. Note that this determination is made for a range until the first sub-block whose coefficient is not changed to zero is found.

When the table Tb8 and the table Tb9 in FIG. 16 are compared, it can be seen that the syntax information to be generated is reduced by the operation of the coefficient substitution determination unit 48a.

2-3. Flow of Processing of Quantization Unit

Figure 17:
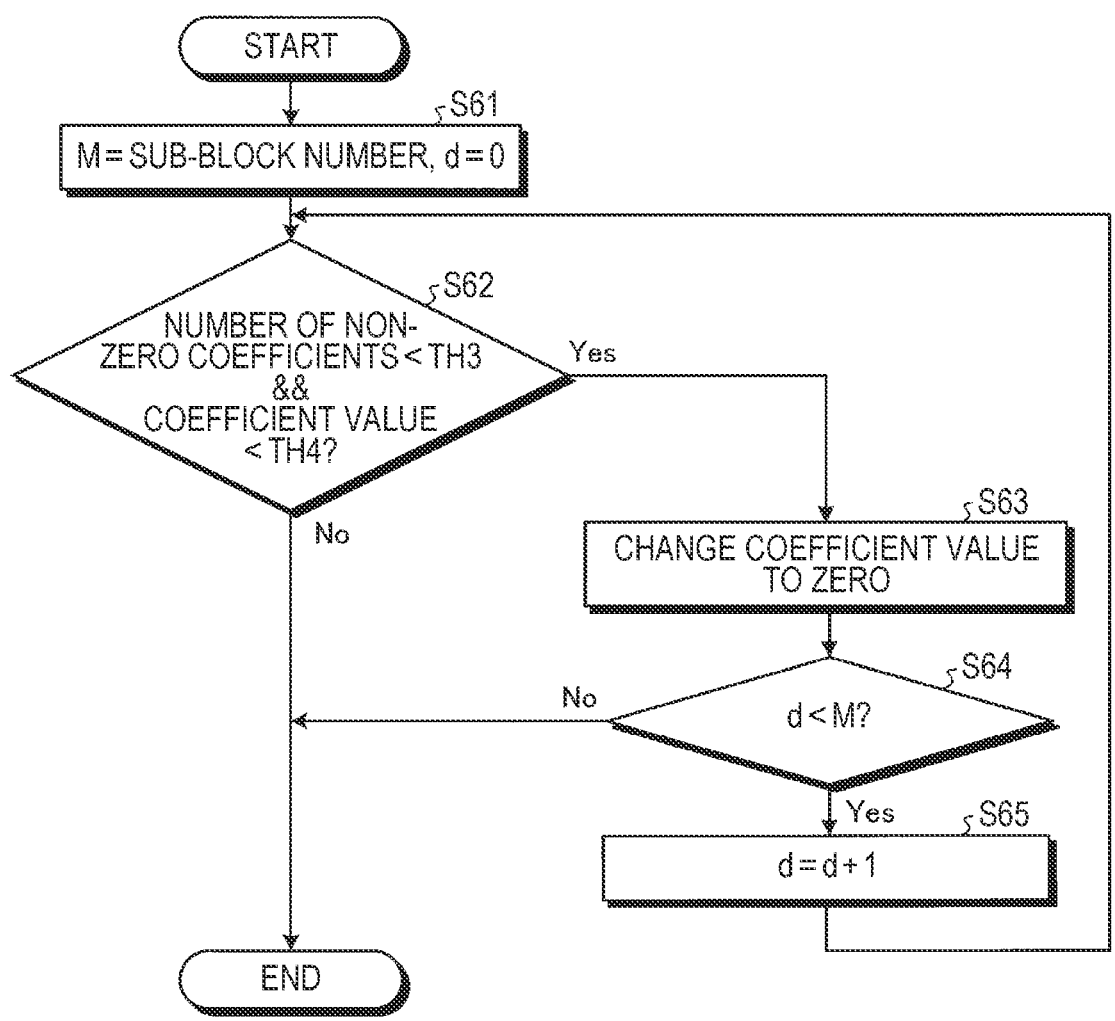
FIG. 17 is a flowchart illustrating an example of a flow of correction of quantization coefficients in the second embodiment.

Next, a flow of correction of quantization coefficients in the second embodiment will be described using FIG. 17. FIG. 17 is a flowchart illustrating an example of a flow of correction of quantization coefficients in the second embodiment. Note that the flowchart of FIG. 17 illustrates a flow of processing after the quantization processing is completed in the scaling unit 30.

The coefficient substitution determination unit 48a acquires the number M of sub-blocks to be processed, and sets the order d of the sub-blocks to be determined to zero (step S61).

The coefficient substitution determination unit 48a determines whether the number of non-zero coefficients is smaller than the second appearance number threshold TH3 and the coefficient values are smaller than the second coefficient value threshold TH4 for the d-th sub-block (step S62). When it is determined that the number of non-zero coefficients is smaller than the second appearance number threshold TH3 and the coefficient values are smaller than the second coefficient value threshold TH4 (step S62: Yes), the processing proceeds to step S63. On the other hand, when it is not determined that the number of non-zero coefficients is smaller than the second appearance number threshold TH3 and the coefficient values are smaller than the second coefficient value threshold TH4 (step S62: No), the processing of FIG. 17 ends.

If Yes is determined in step S62, the coefficient substitution determination unit 48a changes the coefficient value of the d-th sub-block to zero (step S63).

The coefficient substitution determination unit 48a determines whether the order d of the sub-block currently under determination is smaller than the number M of sub-blocks (step S64). If it is determined that the order d of the sub-block currently under determination is smaller than the number M of sub-blocks (step S64: Yes), the processing proceeds to step S65. On the other hand, if it is not determined that the order d of the sub-block currently under determination is smaller than the number M of sub-blocks (step S64: No), the processing of FIG. 17 ends.

If Yes is determined in step S64, the coefficient substitution determination unit 48a increments the order d of the sub-block (step S65). Thereafter, the process returns to step S62.

Note that, in FIG. 17, after searching for the maximum value of the coefficients in the sub-block, the coefficient substitution determination unit 48a may determine whether the maximum value is equal to or less than the second coefficient value threshold Th4.

2-4. Effects of Second Embodiment

As described above, in the image coding device 10b of the second embodiment, the coefficient substitution determination unit 48a (coefficient value change unit) substitutes all coefficient values in the sub-block with zero on the basis of the number of appearances of quantization coefficients that are not zero in the sub-block (block) and the sizes of the quantization coefficients.

Thus, the image coding device 10b determines whether to substitute the coefficients in the sub-block with zero on the basis of the number of non-zero coefficients in the sub-block and the sizes of the non-zero coefficients, and thus the coding distortion and the generated bit do not need to be calculated. Therefore, efficiency of the coding processing can be improved, and hardware implementability is improved.

Furthermore, in the image coding device 10b of the second embodiment, the coefficient substitution determination unit 48a (coefficient value change unit) substitutes all the coefficient values in the sub-block with zero in a case where the number of appearances of quantization coefficients that are not zero in the sub-block (block) is equal to or less than the second appearance number threshold TH3 and the sizes of the coefficients are equal to or less than the second coefficient value threshold TH4.

Consequently, the image coding device 10b determines whether to substitute the coefficients in the sub-block with zero on the basis of the number of non-zero coefficients in the sub-block and the sizes of the non-zero coefficients, and thus it is not necessary to calculate the coding distortion and the generated bit, and it is possible to correct the coefficients in the sub-block just by simple threshold processing. Therefore, efficiency of the coding processing can be improved, and hardware implementability is improved.

Furthermore, in the image coding device 10b, the quantization unit 15b changes the quantization coefficient only on the basis of the threshold processing without using the above-described coding cost Jp, and thus it is possible to achieve a function equivalent to that of the conventional quantization unit 15 without providing the coding distortion calculation unit 43, the code amount calculation unit 44, and the coding cost calculation unit 45 described in FIG. 3.

2-5. Modification Example 1 of Second Embodiment

Figure 18:
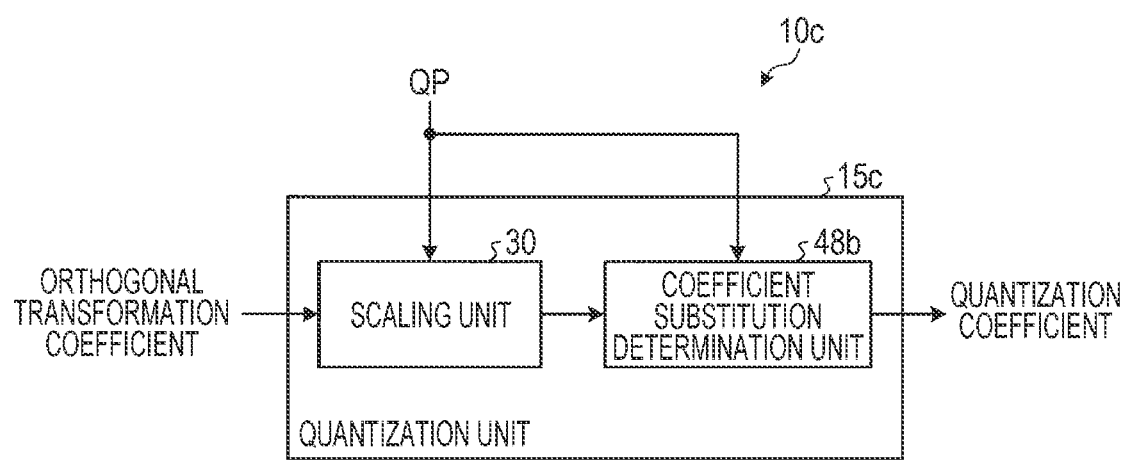
FIG. 18 is a functional block diagram illustrating an example of a functional configuration of a quantization unit according to modification example 1 of the second embodiment.

Next, a first modification example of the second embodiment will be described. FIG. 18 is a functional block diagram illustrating an example of a functional configuration of an image coding device 10c which is modification example 1 of the second embodiment. The image coding device 10c includes a quantization unit 15c instead of the quantization unit 15b in the image coding device 10b described above. Note that the image coding device 10c is an example of an information processing device in the present disclosure.

The quantization unit 15b includes the scaling unit 30 and a coefficient substitution determination unit 48b. Note that the function of the scaling unit 30 is as described above.

The coefficient substitution determination unit 48b has a function of setting the second appearance number threshold TH3 and the second coefficient value threshold TH4 for each sub-block in addition to the function provided in the coefficient substitution determination unit 48a described above. Note that the coefficient substitution determination unit 48b is an example of the coefficient change unit.

Figure 19:
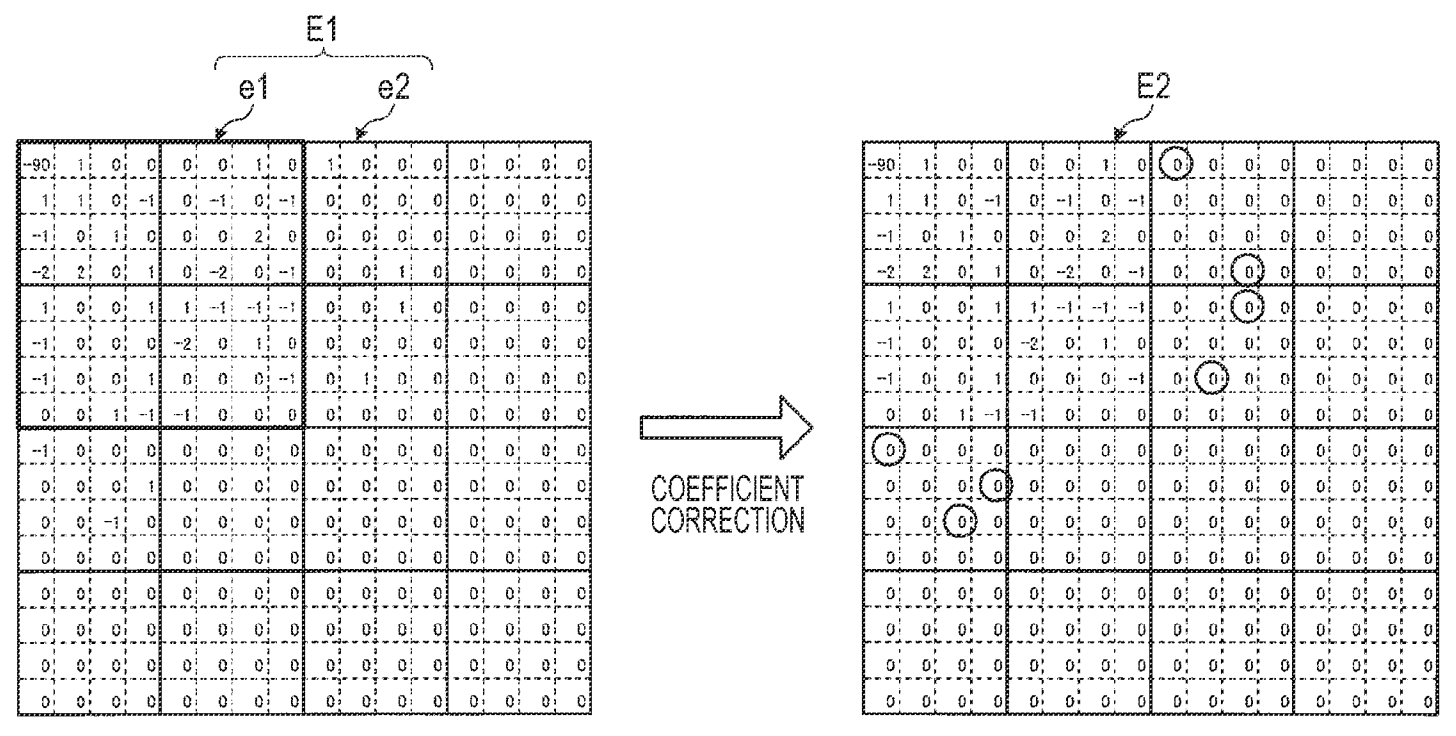

FIG. 19 is a diagram describing a method of correcting quantization coefficients in modification example 1 of the second embodiment. A matrix E1 in FIG. 19 is an example of a matrix indicating a state before correction of the quantization coefficients is performed. The coefficient substitution determination unit 48b sets the second appearance number threshold TH3 and the second coefficient value threshold TH4 to different values from each other for a region e1 and a region e2 in the matrix E1. For example, it is assumed that TH3=3 and Th4=1 are set for the region e1. Then, it is assumed that TH3=17 and Th4=1 are set for the region e2. Note that since the number of coefficients in the sub-block is 16, setting TH3=17 enables setting to always substitute the coefficients in the sub-block with zero.

When such a threshold is set, as illustrated in a matrix E2 in FIG. 19, coefficient values can be substituted with zero even for the sub-block (see the matrix D2 in FIG. 16) in which coefficients cannot be substituted with zero in the second embodiment. Note that the coefficient substitution determination unit 48b can set the second appearance number threshold TH3 and the second coefficient value threshold TH4 for each sub-block. In this manner, by setting the second appearance number threshold TH3 and the second coefficient value threshold TH4 according to the position of the sub-block, for example, the coefficient value can be arbitrarily substituted with zero in the high frequency region.

2-6. Effects of Modification Example 1 of Second Embodiment

As described above, in the image coding device 10c of modification example 1 of the second embodiment, the coefficient substitution determination unit 48b sets the second appearance number threshold TH3 and the second coefficient value threshold TH4 for each sub-block (block).

Thus, the image coding device 10c can substitute all the coefficients of any sub-block in the high frequency region with zero. That is, since coding similar to the zero out technique discussed in VVC can be performed, a circuit size of an inverse orthogonal transformation circuit in the image coding device 10c can be reduced.

2-7. Modification Example 2 of Second Embodiment

Figure 20:
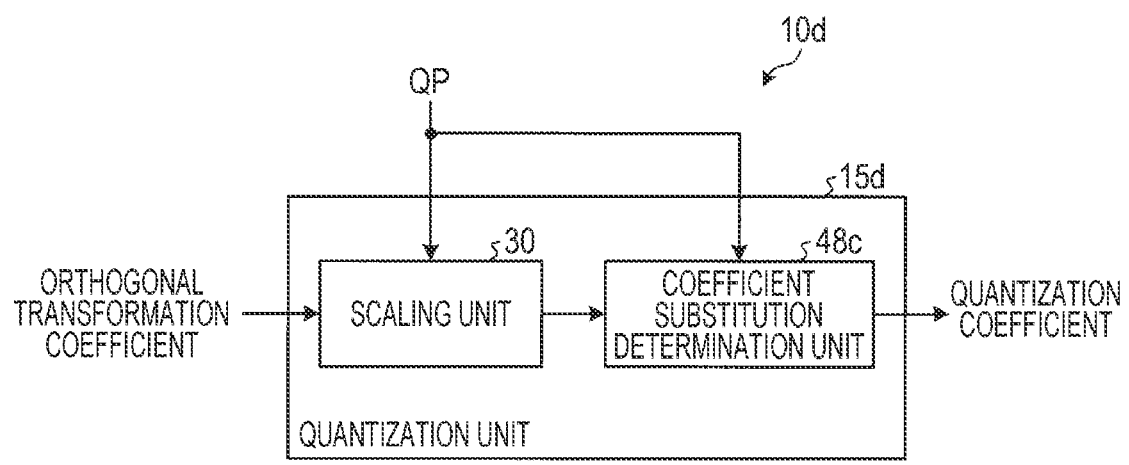
FIG. 20 is a functional block diagram illustrating an example of a functional configuration of a quantization unit according to modification example 2 of the second embodiment.

Next, a second modification example of the second embodiment will be described. FIG. 20 is a functional block diagram illustrating an example of a functional configuration of an image coding device 10d which is modification example 2 of the second embodiment. The image coding device 10d includes a quantization unit 15d instead of the quantization unit 15b in the image coding device 10b described above. Note that the image coding device 10d is an example of an information processing device in the present disclosure.

The quantization unit 15d includes the scaling unit 30 and a coefficient substitution determination unit 48c. Note that the function of the scaling unit 30 is as described above.

The coefficient substitution determination unit 48c includes a function of scanning the sub-blocks in the set scan order in addition to the function provided in the coefficient substitution determination unit 48a described above. Note that the coefficient substitution determination unit 48c is an example of the coefficient change unit. Note that the coefficient substitution determination unit 48c may further include the function provided in the coefficient substitution determination unit 48b.

Figure 21:
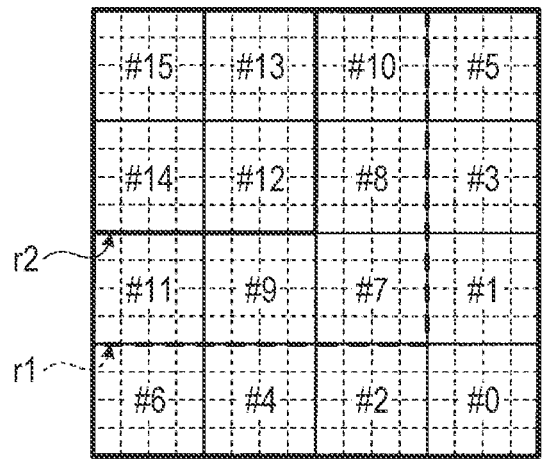
FIG. 21 is a diagram describing scan orders set in modification example 2 of the second embodiment.

FIG. 21 is a diagram describing scan orders set in modification example 2 of the second embodiment. Conventionally, in scanning of sub-blocks, the sub-blocks #0 to #15 are scanned in ascending order from the high frequency side to the low frequency side according to a scan order SC of FIG. 21. Therefore, for example, in a case where the sub-block #11 is scanned in the scan order SC, the sub-block #12 is scanned next. At this time, for example, in a case where the above-described concept of the zero out is applied, it is not necessary to scan the sub-block #12. That is, it is necessary to change the scan order of the sub-blocks depending on whether or not the zero out is applied. Note that, in the VVC, it is discussed to apply the zero out to a sub-block having a TU size of 64*64, but the above-described problem occurs when a similar idea is applied to a TU having a smaller size.

The scan order SC1 in FIG. 21 is an example of a scan order that can be commonly applied regardless of whether the zero out is applied. The scan order SC1 scans the sub-blocks #0 to #15 in ascending order. By applying the scan order SC1, with respect to a region in which a plurality of sub-blocks is gathered in a rectangular shape (square shape or rectangular shape), the sub-blocks constituting the region can be continuously referred to. That is, the rectangular region can be maintained. More specifically, the scan order SC1 is a scan order in which sub-blocks belonging to a rectangular region r1 or a rectangular region r2 illustrated in FIG. 21 can be continuously referred to. Therefore, in a case where the zero out is applied to the rectangular region r1 or the rectangular region r2, it is not necessary to change the scan order from that in a case where the zero out is not applied.

Furthermore, a scan order SC2 is a scan order in which a plurality of sub-blocks is scanned in the lateral direction. A scan order SC3 is a scan order in which a plurality of sub-blocks is scanned in the vertical direction. Each of the scan orders SC2 and SC3 scans the sub-blocks #0 to #15 in ascending order. In a case where the image coding device 10d is operating in the intra prediction mode, it is desirable to perform scanning according to a prediction direction when intra prediction is performed. In such a case, the coefficient substitution determination unit 48c can set the scan orders SC2 and SC3 and the like according to the prediction direction.

The coefficient substitution determination unit 48c may execute a specific scan order including the scan order illustrated in FIG. 21, or the user may select an arbitrary scan order. Furthermore, the coefficient substitution determination unit 48c may change the scan order according to a coding condition of the image coding device 10d. For example, in a case where the image coding device 10d operates in the inter prediction mode, scanning may be performed in the scan order SC1 maintaining a rectangle or the scan order SC as in the related art. Furthermore, as described above, in a case where the image coding device 10d operates in the intra prediction mode, the scan order according to the prediction direction may be applied.

Figure 22:
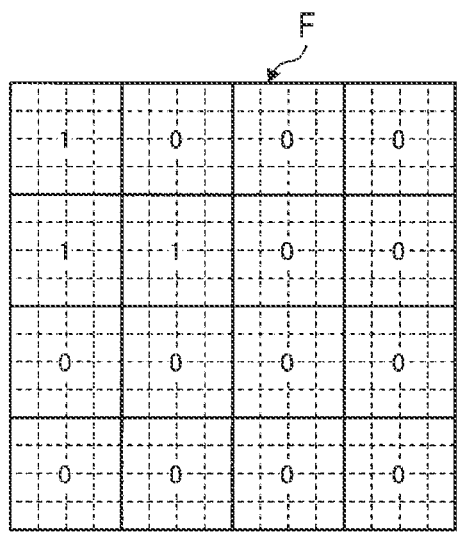
FIG. 22 is a diagram describing an effect of correcting the quantization coefficient in modification example 2 of the second embodiment.

FIG. 22 is a diagram describing an effect of correcting the quantization coefficient in modification example 2 of the second embodiment. A matrix F in FIG. 22 indicates whether or not there are non-zero coefficients in the sub-blocks. That is, it is assumed that one is stored in a case where there is a non-zero coefficient in a sub-block in the matrix F, and zero is stored in a case where there is no non-zero coefficient.

At this time, when scanning is performed in the conventional scan order SC (FIG. 21), syntax information illustrated in a table Tb10 is obtained. In this case, the number of symbols to be transmitted is four. On the other hand, when scanning is performed in the scan order SC1 (FIG. 21), syntax information illustrated in a table Tb11 is obtained. In this case, the number of symbols to be transmitted is three. In this manner, by using the scan order SC1 maintaining the rectangle, the syntax can be reduced. That is, it is possible to reduce generated bits when arithmetic coding is performed in the reversible coding unit 16 (FIG. 1) in the subsequent stage.

2-8. Effect of Modification Example 2 of Second Embodiment

As described above, the image coding device 10d of modification example 2 of the second embodiment scans the sub-blocks (blocks) in the scan order set by the coefficient substitution determination unit 48c.

Thus, the image coding device 10d can set an appropriate scan order, and thus the number of symbols included in the syntax to be transmitted can be reduced. Therefore, the generated bits after coding can be reduced.

Furthermore, in the image coding device 10d, the coefficient substitution determination unit 48c sets, for a region in which a plurality of sub-blocks (blocks) is gathered in a rectangular shape, a scan order for continuously referring to the sub-blocks constituting the region.

Thus, the concept of zero out proposed in VVC can also be applied to a case where the TU size is smaller. Furthermore, it is not necessary to change the scan order between a case of applying the zero out and a case of not applying the zero out, it is possible to improve processing efficiency.

3. Third Embodiment

In the RDOQ, the coefficient value is evaluated for each non-zero coefficient of the sub-block. That is, while changing the coefficient value, the coding cost Jp according to the coding distortion Dp and the generated bit Rp is calculated by iterative calculation, and the coefficient value at which the coding cost Jp is minimized is determined. Therefore, the problem is that the calculation cost is high and hardware implementability is low.

A third embodiment of the present disclosure is an example of an image coding device 10e including a function of correcting quantization coefficients in a sub-block. The image coding device 10e includes a quantization unit 15e instead of the quantization unit 15 in the image coding device 10 described above. Note that the image coding device 10e is an example of an information processing device in the present disclosure.

3-1. Functional Configuration of Quantization Unit

FIG. 23 is a functional block diagram illustrating an example of a functional configuration of the quantization unit 15e according to the third embodiment. The quantization unit 15e includes the scaling unit 30 and a coefficient value correction unit 49. Note that the function of the scaling unit 30 is as described above.

The coefficient value correction unit 49 compares a coefficient value with a clip threshold TH5 with respect to a quantization coefficient corresponding to a component other than a direct current component (DC) among the non-zero coefficients stored in the sub-block. Then, the coefficient value correction unit 49 clips the quantization coefficient exceeding the clip threshold TH5 to the clip threshold TH5. Note that the coefficient value correction unit 49 is an example of the coefficient change unit. Furthermore, the coefficient value correction unit 49 is an extension of the function of the coefficient size determination unit 40 in FIG. 3.

3-2. Operation of Quantization Unit

FIG. 24 is a diagram describing a method of correcting quantization coefficients in the third embodiment. A matrix G1 in FIG. 24 illustrates an example of a processing result of the scaling unit 30, that is, a quantization result.

Here, it is assumed that the coefficient value correction unit 49 sets the clip threshold TH5 to three. At this time, in the matrix G1, the absolute value of the quantization coefficient exceeds the clip threshold TH5 for a coefficient value "−90" at a position of (0, 0) and a coefficient value "6" at a position of (3, 1). The coefficient value correction unit 49 does not perform processing of coefficient value correction on the position (0, 0) where the direct current component (DC) is stored. Then, the coefficient value correction unit 49 performs a process of clipping the quantization coefficient by three on the position of (3, 1). As a result of performing the processing of coefficient value correction in this manner, the matrix G2 in FIG. 24 is obtained.

Note that the clip threshold TH5 is determined, for example, on the basis of the quantization parameter QP when the scaling unit 30 performs quantization.

3-3. Flow of Processing of Quantization Unit

Figure 25:
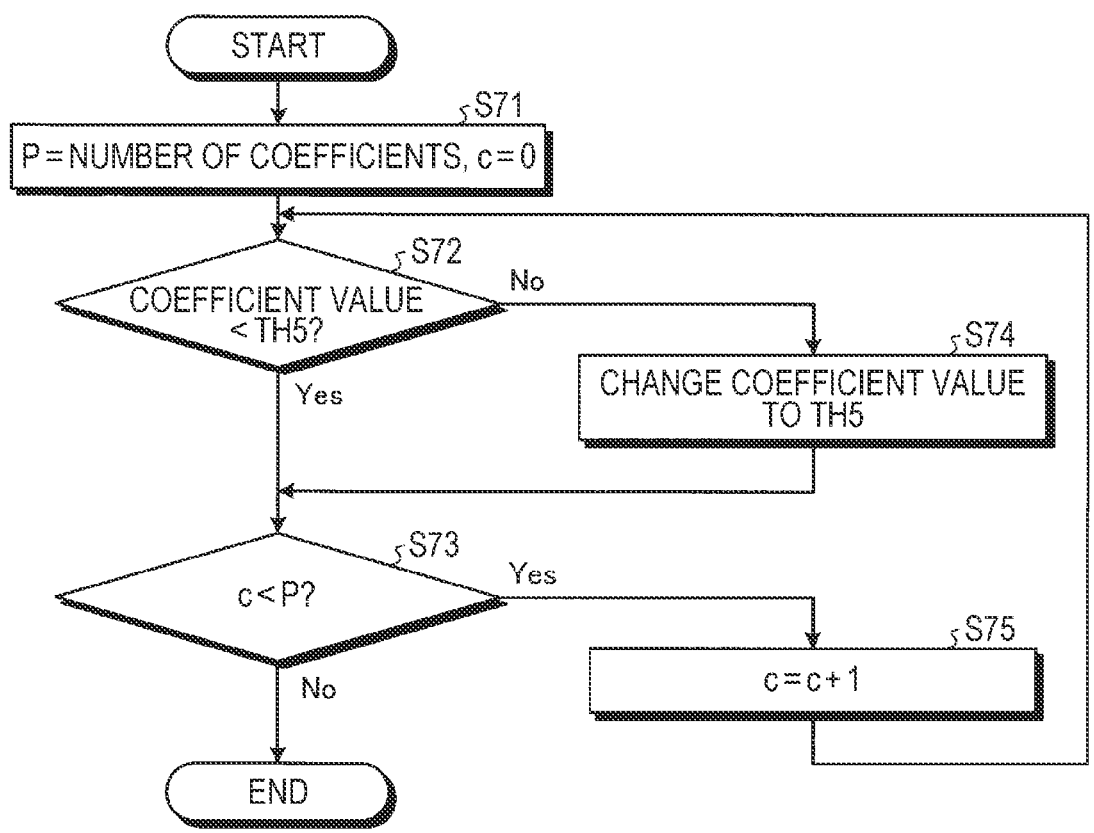
FIG. 25 is a flowchart illustrating an example of a flow of correction of quantization coefficients in the third embodiment.

Next, a flow of correction of quantization coefficients in the third embodiment will be described using FIG. 25. FIG. 25 is a flowchart illustrating an example of a flow of correction of quantization coefficients in the third embodiment. Note that the flowchart of FIG. 25 illustrates the flow of processing after the quantization processing is completed in the scaling unit 30.

The coefficient value correction unit 49 acquires the number P of coefficients of the sub-block to be processed, and sets the coefficient order c in the sub-block to be determined to zero (step S71).

The coefficient value correction unit 49 determines whether the coefficient value is smaller than the clip threshold TH5 (step S72). If it is determined that the coefficient value is smaller than the clip threshold TH5 (step S72: Yes), the processing proceeds to step S73. On the other hand, if it is not determined that the coefficient value is smaller than the clip threshold TH5 (step S72: No), the processing proceeds to step S74.

If Yes is determined in step S72, the coefficient value correction unit 49 determines whether the coefficient order c currently under determination is smaller than the number P of coefficients of the sub-block (step S73). If it is determined that the coefficient order c currently under determination is smaller than the number P of coefficients of the sub-block (step S73: Yes), the processing proceeds to step S75. On the other hand, if it is not determined that the coefficient order c currently under determination is smaller than the number P of coefficients of the sub-block (step S73: No), the processing of FIG. 25 is ended.

On the other hand, if No is determined in step S72, the coefficient value correction unit 49 changes the coefficient value currently under determination to the value of the clip threshold TH5 (step S74). Thereafter, the processing proceeds to step S73.

Furthermore, if No is determined in step S73, the coefficient value correction unit 49 increments the coefficient order c (step S75). Thereafter, the processing returns to step S72.

3-4. Effects of Third Embodiment

As described above, in the image coding device 10e of the third embodiment, in a case where the quantization coefficient corresponding to a component other than the direct current component in the sub-block (block) exceeds the clip threshold TH5, the coefficient value correction unit 49 (coefficient change unit) clips the quantization coefficient to the clip threshold TH5.

Thus, since the image coding device 10e determines the size of the coefficient by threshold processing, the quantization coefficient can be corrected without calculating the coding cost Jp according to the coding distortion Dp and the generated bit Rp by iterative calculation. Therefore, efficiency of the coding processing can be improved, and hardware implementability is improved.

Furthermore, in the image coding device 10e, the quantization unit 15e corrects the quantization coefficient without using the coding cost Jp, and thus it is possible to achieve a function equivalent to that of the quantization unit 15 without providing the coding distortion calculation unit 43, the code amount calculation unit 44, and the coding cost calculation unit 45 described in FIG. 3.

Note that in a case where the clip threshold TH5 is set to a small value, for example, one, it is not necessary to transmit coeff_abs_level_greater2 and coeff_abs_level_remain, which are information related to the size of the quantization coefficient illustrated in FIG. 9, to the reversible coding unit 16 (FIG. 1). Thus, the size of syntax is reduced, and thus the amount of arithmetic coding processing can be reduced, and the processing cost can be reduced.

Moreover, in a case where the clip threshold TH5 is set to three or less, it is possible to improve efficiency when the reversible coding unit 16 generates a symbol (code) from the syntax of coeff_abs_level_remain. That is, if the clip threshold TH5 is set to three or less, the value of coeff_abs_level_remain to be transmitted is smaller than three. Therefore, in a case where Exponential Golomb-k coding is used in generating the symbol, k=1 is always satisfied, and thus it is possible to reduce a circuit of the Exponential Golomb-k coding corresponding to k=2.

4. Fourth Embodiment

In the RDOQ, the coefficient value is evaluated for each non-zero coefficient of the sub-block. That is, while changing the coefficient value, the coding cost Jp according to the coding distortion Dp and the generated bit Rp is calculated by iterative calculation, and the coefficient value at which the coding cost Jp is minimized is determined. Therefore, the problem is that the calculation cost is high and hardware implementability is low.

A fourth embodiment of the present disclosure is an example of an image coding device 10f including a function of correcting a quantization coefficient in a sub-block. The image coding device 10f includes a quantization unit 15f instead of the quantization unit 15 in the image coding device 10 described above. Note that the image coding device 10f is an example of an information processing device in the present disclosure.

4-1. Functional Configuration of Quantization Unit

Figure 26:
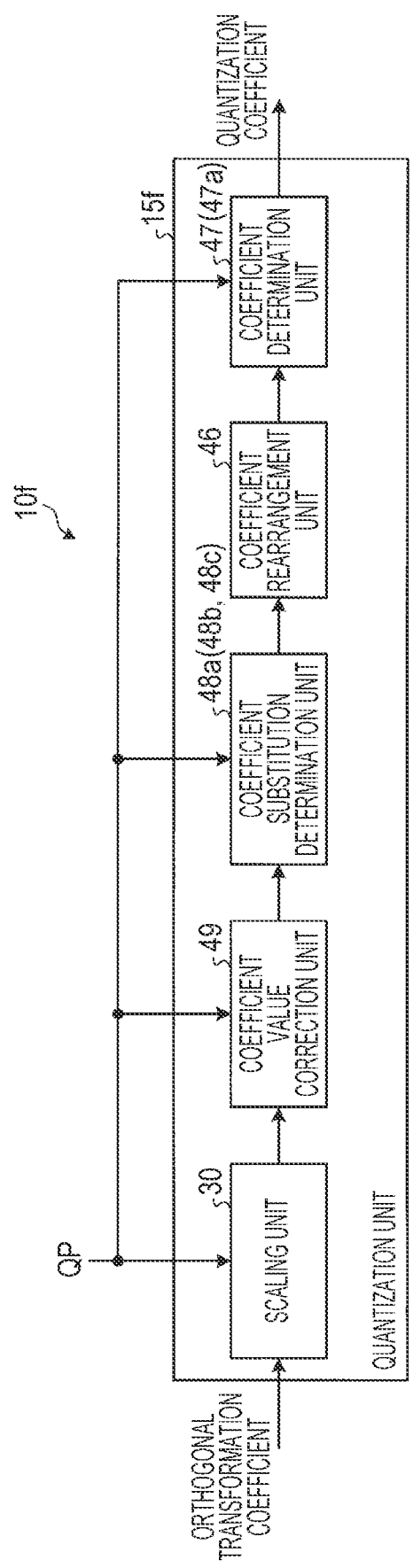
FIG. 26 is a functional block diagram illustrating an example of a functional configuration of a quantization unit according to a fourth embodiment.

FIG. 26 is a functional block diagram illustrating an example of a functional configuration of a quantization unit 15f according to the fourth embodiment. The quantization unit 15f includes a scaling unit 30, a coefficient value correction unit 49, a coefficient substitution determination unit 48a, a coefficient rearrangement unit 46, and a coefficient determination unit 47. The functions of these units are all as described in the embodiments described above. Note that instead of the coefficient substitution determination unit 48*a*, a coefficient substitution determination unit 48*b* or a coefficient substitution determination unit 48*b* may be included.

That is, the quantization unit 15*f* includes, as the coefficient change unit, the functions of the coefficient rearrangement unit 46 and the coefficient determination unit 47 (47*a*) described in the first embodiment, the function of the coefficient substitution determination unit 48*a* (48*b*, 48*c*) described in the second embodiment, and the function of the coefficient value correction unit 49 described in the third embodiment.

In the quantization unit 15*f*, each of the above-described units executes the processing described in each of the above-described embodiments.

4-2. Flow of Processing of Quantization Unit

Figure 27:
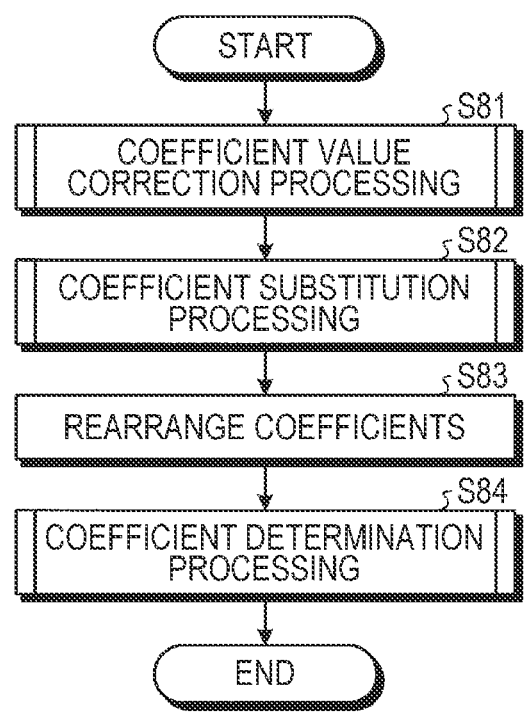
FIG. 27 is a flowchart illustrating an example of a flow of correction of a quantization coefficient in the fourth embodiment.

Next, a flow of correction of quantization coefficients in the fourth embodiment will be described using FIG. 27. FIG. 27 is a flowchart illustrating an example of a flow of correction of a quantization coefficient in the fourth embodiment. Note that the flowchart of FIG. 27 illustrates the flow of processing after quantization processing is completed in the scaling unit 30.

The coefficient value correction unit 49 performs coefficient value correction processing of correcting the coefficient value of each sub-block (step S81). Note that the coefficient value correction processing is performed along the flowchart of FIG. 25 described above.

The coefficient substitution determination unit 48*a* (48*b*, 48*c*) determines whether to change all coefficients of each sub-block to zero, and performs coefficient substitution processing of changing all the coefficients to zero when the condition is satisfied (step S82). Note that the coefficient substitution processing is performed along the flowchart of FIG. 17 described above.

The coefficient rearrangement unit 46 rearranges the respective quantization coefficients stored in the sub-blocks by the scaling unit 30 in the order from the low frequency side to the high frequency side (step S83).

The coefficient determination unit 47 (47*a*) performs coefficient determination processing of changing a coefficient value in a specific frequency range among the quantization coefficients to zero (step S84). Note that the processing of steps S83 and S84 is performed along the flowchart of FIG. 12 (FIG. 14) described above.

4-3. Effects of Fourth Embodiment

As described above, in the image coding device 10*f* of the fourth embodiment, in a case where the quantization coefficient corresponding to a component other than the direct current component among the quantization coefficients quantized by the scaling unit 30 (quantization processing unit) and stored in the sub-block (block) exceeds the clip threshold TH5, the coefficient value correction unit 49 (coefficient change unit) clips this quantization coefficient to the clip threshold TH5. The coefficient substitution determination unit 48 (coefficient change unit) substitutes all quantization coefficients in the sub-block with zero on the basis of the number of appearances of quantization coefficients that are not zero in the sub-block and the sizes of the quantization coefficients. Then, the coefficient determination unit 47 (coefficient change unit) counts the number of applications of quantization coefficients that are not zero when the coefficient rearrangement unit 46 rearranges the quantization coefficients stored in the sub-blocks from the low frequency side toward the high frequency side in order of the rearrangement, and changes a quantization coefficient that is not zero and appears after the number of applications exceeds the first appearance number threshold TH1 to zero.

Thus, the quantization unit 15*f* can achieve a function equivalent to that provided in the RDOQ operation unit 31 (FIG. 3) without providing the coding distortion calculation unit 43, the code amount calculation unit 44, and the coding cost calculation unit 45. Then, since it is not necessary to perform the iterative operation when the quantization coefficient is corrected, hardware implementability can be improved.

Note that the quantization unit 15*f* has been described as including the coefficient rearrangement unit 46 and the coefficient determination unit 47 (47*a*), the coefficient substitution determination unit 48*a* (48*b*, 48*c*), and the coefficient value correction unit 49, but may include only a part thereof. That is, the quantization unit 15*f* may include the coefficient rearrangement unit 46 and the coefficient determination unit 47 (47*a*), and the coefficient substitution determination unit 48*a* (48*b*, 48*c*). Further, the quantization unit 15*f* may include the coefficient rearrangement unit 46 and the coefficient determination unit 47 (47*a*), and the coefficient value correction unit 49. Furthermore, the quantization unit 15*f* may include the coefficient substitution determination unit 48*a* (48*b*, 48*c*) and the coefficient value correction unit 49.

Furthermore, in the first to fourth embodiments, it has been described that the various thresholds (TH1, TH2, TH3, TH4, TH5) are set according to the quantization parameter QP, but this is not limited to the quantization parameter QP. That is, for example, the various thresholds may be set according to the size of the TU, or may be set according to characteristics (for example, the distribution state of a frequency component, or the like) of the image to be coded. Alternatively, the setting may be performed according to a combination of the plurality of pieces of information.

5. Description of Hardware Configuration

5-1. Description of Computer to which Present Disclosure is Applied

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

Figure 28:
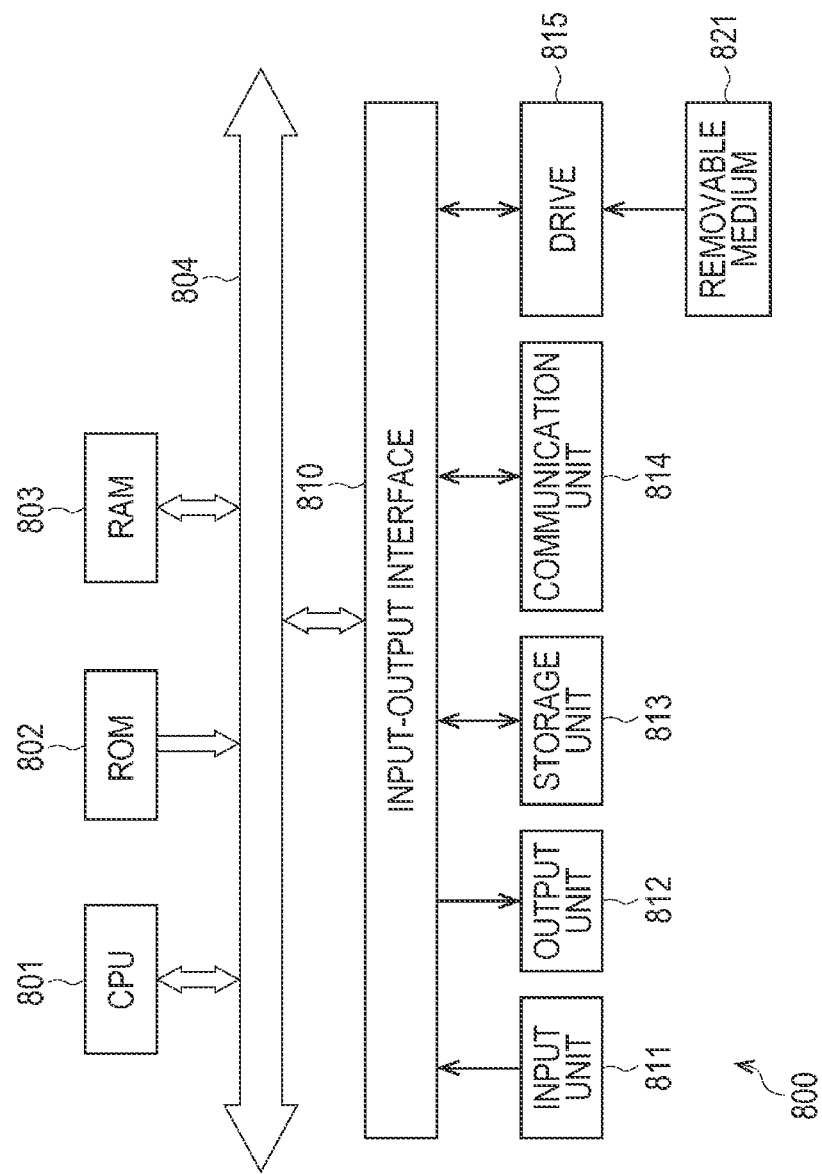
FIG. 28 is a block diagram illustrating an example of a hardware configuration of a computer that executes functions of respective embodiments by a program.

FIG. 28 is a block diagram illustrating an example of a hardware configuration of a computer that executes the functions of the respective embodiments by a program.

In a computer 800, a central processing unit (CPU) 801, a read only memory (ROM) 802, and a random access memory (RAM) 803 are interconnected via a bus 804.

An input-output interface 810 is further connected to the bus 804. An input unit 811, an output unit 812, a storage unit 813, a communication unit 814, and a drive 815 are connected to the input-output interface 810.

The input unit 811 includes a keyboard, a mouse, a microphone, and the like. The output unit 812 includes a display, a speaker, and the like. The storage unit 813 includes a hard disk, a nonvolatile memory, and the like. The communication unit 814 includes a network interface and the like. The drive 815 drives a removable medium 821 such as a magnetic disk, an optical disk, a magneto-optical disk, or a semiconductor memory.

In the computer 800 configured as described above, for example, the CPU 801 loads the program stored in the storage unit 813 into the RAM 803 via the input-output interface 810 and the bus 804 and executes the program, to thereby perform the above-described series of processes.

The program executed by the computer 800 (CPU 801) can be provided by being recorded on, for example, a removable medium 821 as a package medium or the like. Furthermore, the program can be provided via a wired or wireless transmission medium such as a local area network, the Internet, or digital satellite broadcasting.

In the computer 800, the program is installed in the storage unit 813 via the input-output interface 810 by attaching the removable medium 821 to the drive 815. Furthermore, the program may be received by the communication unit 814 via a wired or wireless transmission medium and installed in the storage unit 813. Moreover, the program may be installed in the ROM 802 or the storage unit 813 in advance.

Note that the program executed by the computer 800 may be a program for processing in time series in the order described in the present disclosure, or a program for processing in parallel or at a necessary timing such as when a call is made.

Note that the effects described in the present description are merely examples and are not limited, and other effects may be provided. Furthermore, the embodiment of the present disclosure is not limited to the above-described embodiments, and various modifications can be made without departing from the gist of the present disclosure.

Note that the present disclosure can also have the following configurations.

(1)
An information processing device including:
a quantization processing unit that quantizes a coding target image divided into blocks; and
a coefficient change unit that changes a coefficient value in a specific frequency range among quantization coefficients corresponding to the blocks calculated by quantization.

(2)
The information processing device according to (1) above, in which
the coefficient change unit
further includes a coefficient rearrangement unit that rearranges the quantization coefficients stored in the blocks in order from a low frequency side to a high frequency side, and
counts a number of appearances of quantization coefficients that are not zero among the quantization coefficients rearranged by the coefficient rearrangement unit in order of the rearrangement, and changes a quantization coefficient that is not zero and appears after the number of appearances exceeds a first appearance number threshold to zero.

(3)
The information processing device according to (2) above, in which
in a case where a quantization coefficient having a size exceeding a first coefficient value threshold appears after the number of appearances exceeds the first appearance number threshold,
the coefficient change unit does not change the quantization coefficient to zero.

(4)
The information processing device according to (3) above, in which
the first appearance number threshold and the first coefficient value threshold are determined on the basis of a quantization parameter when the quantization processing unit performs quantization.

(5)
The information processing device according to (1) above, in which
the coefficient change unit
substitutes all coefficient values in the blocks with zero on the basis of a number of appearances of quantization coefficients that are not zero in the blocks and sizes of the quantization coefficients.

(6)
The information processing device according to (5) above, in which
the coefficient change unit
substitutes all coefficient values in the blocks with zero in a case where the number of appearances of quantization coefficients that are not zero in the blocks is equal to or less than a second appearance number threshold and sizes of the quantization coefficients are equal to or smaller than a second coefficient value threshold.

(7)
The information processing device according to (6) above, in which
the coefficient change unit
sets the second appearance number threshold and the second coefficient value threshold for each of the blocks.

(8)
The information processing device according to any one of (5) to (7) above, in which
the coefficient change unit
scans the blocks in a set scan order.

(9)
The information processing device according to any one of (5) to (8) above, in which
the coefficient change unit
sets, for a region in which a plurality of the blocks is gathered in a rectangular shape, a scan order for continuously referring to the blocks constituting the region.

(10)
The information processing device according to (1) above, in which
in a case where a quantization coefficient corresponding to a component other than a direct current component in the blocks exceeds a clip threshold,
the coefficient change unit clips the quantization coefficient to the clip threshold.

(11)
The information processing device according to (1) above, in which
the coefficient change unit includes:
a function of clipping, in a case where a quantization coefficient corresponding to a component other than a direct current component among quantization coefficients quantized by the quantization processing unit and stored in the blocks exceeds a clip threshold, the quantization coefficient to the clip threshold;
a function of substituting all coefficient values in the blocks with zero on the basis of a number of appearances of quantization coefficients that are not zero in the blocks and sizes of the quantization coefficients; and a function of counting a number of appearances of quantization coefficients that are not zero when the quantization coefficients stored in the blocks are rearranged from a low frequency side toward a high frequency side in order of the rearrangement, and changing a quantization coefficient that is not zero and appears after the number of appearances exceeds a first appearance number threshold to zero.

(12)

An information processing method including: quantizing a coding target image divided into blocks; and
changing a coefficient value in a specific frequency range among quantization coefficients corresponding to the blocks calculated by quantization.

(13)

A program causing a computer included in an information processing device to function as:
a quantization processing unit that quantizes a coding target image divided into blocks; and
a coefficient change unit that changes a coefficient value in a specific frequency range among quantization coefficients corresponding to the blocks calculated by quantization.

REFERENCE SIGNS LIST 10, 10a, 10b, 10c, 10d, 10e, 10f Image coding device (information processing device)
30 Scaling unit (quantization processing unit)
46 Coefficient rearrangement unit
47, 47a Coefficient determination unit (coefficient change unit)
48a, 48b, 48c Coefficient substitution determination unit (coefficient change unit)
49 Coefficient value correction unit (coefficient change unit)
QP Quantization parameter
TH1 First appearance number threshold
TH2 First coefficient value threshold
TH3 Second appearance number threshold
TH4 Second coefficient value threshold
TH5 Clip threshold

The invention claimed is:

1. An information processing device, comprising:
a central processing unit (CPU) configured to:
execute quantization to obtain a plurality of quantization coefficients for a coding target image divided into blocks;
rearrange, the plurality of quantization coefficients in the blocks, in order from a low frequency side to a high frequency side;
count, in order of the rearrangement, a number of appearances of quantization coefficients that are not zero among the rearranged plurality of quantization coefficients; and
change a coefficient value of a quantization coefficient of the rearranged plurality of quantization coefficients to zero in a case where the quantization coefficient is not zero and appears after the number of appearances exceeds a first appearance number threshold, wherein
a value of the first appearance number threshold is based on a value of a quantization parameter associated with the executed quantization, and
the quantization parameter indicates a quantization width for each frequency.

2. The information processing device according to claim 1, wherein, in a case where the quantization coefficient of the rearranged plurality of quantization coefficients has a size that exceeds a first coefficient value threshold and appears after the number of appearances exceeds the first appearance number threshold, the CPU is further configured to set the coefficient value of the quantization coefficient as it is without the change in the coefficient value to zero.

3. The information processing device according to claim 2, wherein the first coefficient value threshold is based on the quantization parameter.

4. The information processing device according to claim 1, wherein the change includes substitution of all coefficient values of the plurality of quantization coefficients in the blocks with zero based on the number of appearances of the quantization coefficients that are not zero in the blocks and sizes of the plurality of quantization coefficients.

5. The information processing device according to claim 4, wherein the substitution of all the coefficient values in the blocks with zero is in a case where
the number of appearances of the quantization coefficients that are not zero in the blocks is equal to or less than a second appearance number threshold, and
the sizes of the plurality of quantization coefficients are equal to or smaller than a second coefficient value threshold.

6. The information processing device according to claim 5, wherein the CPU is further configured to set the second appearance number threshold and the second coefficient value threshold for each of the blocks.

7. The information processing device according to claim 4, wherein the CPU is further configured to scan the blocks in a set scan order.

8. The information processing device according to claim 4, wherein the CPU is further configured to set, for a region in which a plurality of blocks is gathered in a rectangular shape, a scan order to continuously refer to the plurality of blocks constituting the region.

9. The information processing device according to claim 1, wherein, in a case where the quantization coefficient corresponds to a component other than a direct current component in the blocks and exceeds a clip threshold, the CPU is further configured to clip the quantization coefficient to the clip threshold.

10. The information processing device according to claim 1, wherein the CPU is further configured to:
clip, in a case where the quantization coefficient corresponds to a component other than a direct current component among the plurality of quantization coefficients in the blocks and exceeds a clip threshold, the quantization coefficient to the clip threshold; and
substitute all coefficient values of the plurality of quantization coefficients in the blocks with zero based on the number of appearances of the quantization coefficients that are not zero in the blocks and sizes of the plurality of quantization coefficients.

11. An information processing method, comprising:
executing quantization to obtain a plurality of quantization coefficients for a coding target image divided into blocks;
rearranging, the plurality of quantization coefficients in the blocks, in order from a low frequency side to a high frequency side;
counting, in order of the rearrangement, a number of appearances of quantization coefficients that are not zero among the rearranged plurality of quantization coefficients; and changing a coefficient value of a quantization coefficient of the rearranged plurality of quantization coefficients to zero in a case where the quantization coefficient is not zero and appears after the number of appearances exceeds an appearance number threshold, wherein a value of the appearance number threshold is based on a value of a quantization parameter associated with the executed quantization, and the quantization parameter indicates a quantization width for each frequency.

12. A non-transitory computer-readable medium having stored thereon, computer-executable instructions which, when executed by a computer, cause the computer to execute operations, the operations comprising:

executing quantization to obtain a plurality of quantization coefficients for a coding target image divided into blocks;

rearranging, the plurality of quantization coefficients in the blocks, in order from a low frequency side to a high frequency side;

counting, in order of the rearrangement, a number of appearances of quantization coefficients that are not zero among the rearranged plurality of quantization coefficients; and changing a coefficient value of a quantization coefficient of the rearranged plurality of quantization coefficients to zero in a case where the quantization coefficient is not zero and appears after the number of appearances exceeds an appearance number threshold, wherein a value of the appearance number threshold is based on a value of a quantization parameter associated with the executed quantization, and the quantization parameter indicates a quantization width for each frequency.

* * * * *